United States Patent
Irie

(10) Patent No.: US 8,158,918 B2
(45) Date of Patent: Apr. 17, 2012

(54) IMAGING APPARATUS, CONTROL METHOD THEREOF, AND COMPUTER-READABLE STORAGE MEDIUM STORING PROGRAM

(75) Inventor: Yoshiaki Irie, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 497 days.

(21) Appl. No.: 12/495,812

(22) Filed: Jul. 1, 2009

(65) Prior Publication Data

US 2010/0002101 A1 Jan. 7, 2010

(30) Foreign Application Priority Data

Jul. 3, 2008 (JP) ................................. 2008-174956

(51) Int. Cl.
*H04N 5/225* (2006.01)

(52) U.S. Cl. .............. 250/206.1; 250/201.1; 348/208.11

(58) Field of Classification Search ............... 250/206.1, 250/201.1; 348/205, 208.11, 234, 340, 374, 348/351

See application file for complete search history.

(56) References Cited

U.S. PATENT DOCUMENTS

| 7,787,045 B2* | 8/2010 | Ueda et al. ................... 348/364 |
| 7,853,097 B2* | 12/2010 | Ishiga ........................... 382/275 |
| 2004/0012714 A1 | 1/2004 | Kawai |

FOREIGN PATENT DOCUMENTS

| JP | 2002-204379 A | 7/2002 |
| JP | 2004-172820 A | 6/2004 |

* cited by examiner

*Primary Examiner* — Tony Ko

(74) *Attorney, Agent, or Firm* — Carter, DeLuca, Farrell & Schmidt LLP

(57) ABSTRACT

Foreign substance information about at last including a position of a foreign substance adhered to an optical element disposed in front of an image sensor is detected, and whether the position of the foreign substance overlaps a predetermined area of an object is determined by analyzing an image signal of the object generated by the image sensor. When it is determined that the position of the foreign substance overlaps the predetermined area of the object, a relative position of the image of the object formed on the image sensor and the image sensor is changed.

12 Claims, 17 Drawing Sheets

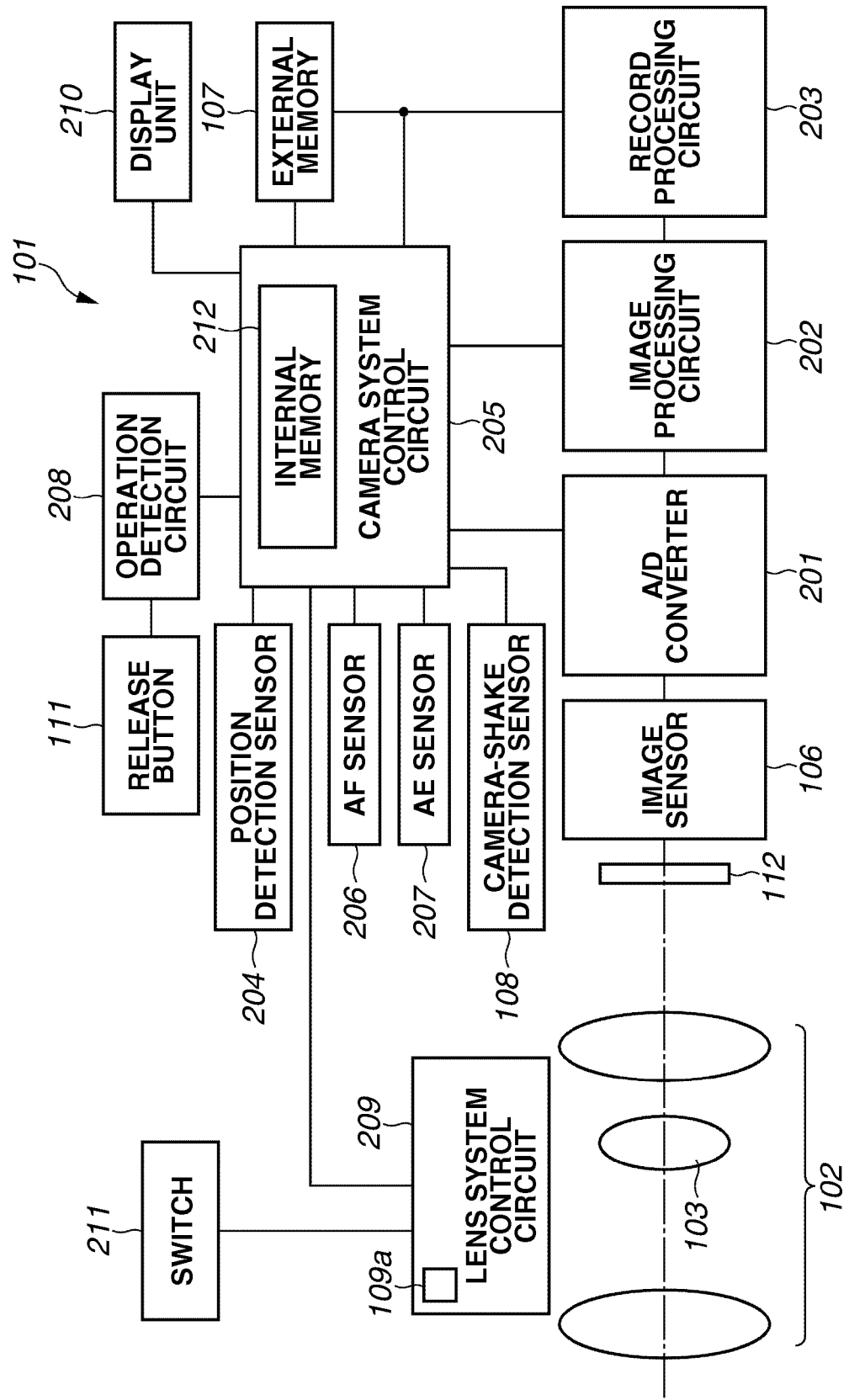

IMAGING APPARATUS, CONTROL METHOD THEREOF, AND COMPUTER-READABLE STORAGE MEDIUM STORING PROGRAM

BACKGROUND OF THE INVENTION

1. Field of the Invention

The present invention relates to a technique for imaging apparatuses, such as digital cameras and digital video cameras, to prevent deterioration in image quality due to a foreign substance that is adhered to an optical element, such as an optical low-pass filter, disposed in front of the image sensor and that is captured in a shot image.

2. Description of the Related Art

In recent years, cameras have been rapidly digitalized. Especially, there have been widely used digital single lens reflex cameras, which have an optical arrangement similar to that in conventional single lens reflex cameras. In the digital single lens reflex cameras, film is replaced with an image sensor that performs photoelectric conversion.

The digital single lens reflex cameras do not require film winding operation and film exchange operation. Accordingly, in an operation of exchanging a shooting lens, once a foreign substrate, such as dust, intrudes into the vicinity of the image sensor, the foreign substance continues to appear in captured images. Accordingly, the quality of the series of the shot images is decreased.

Japanese Patent Application Laid-Open No. 2002-204379 discusses a method for removing a foreign substance in an imaging apparatus. In the method discussed in Japanese Patent Application Laid-Open No. 2002-204379, by operating a dust prevention element disposed in the vicinity of an imaging plane, a foreign substance adhered during operation such as lens exchange can be removed. Therefore, the user does not need to perform cleaning operation using a blower. As the result, a high-quality image can be easily obtained.

Japanese Patent Application Laid-Open No. 2004-172820 discusses a method for detecting a foreign substance from a plurality of images. In the method discussed in Japanese Patent Application Laid-Open No. 2004-172820, invariant contrast portions across a plurality of images that are preliminarily acquired by a user are detected.

Then, based on the information of the detected invariant contrast portions, the position of a foreign substance is detected. The user appropriately removes the foreign substance using a cleaning mode, and performs shooting. Thus, a high-quality image can be obtained.

However, in the technique discussed in Japanese Patent Application Laid-Open No. 2002-204379, it is necessary to newly provide the dust prevention element, and the production cost increases. Further, a structural space for the dust prevention element is required, and this causes increase in the size of the overall camera.

Further, in Japanese Patent Application Laid-Open No. 2004-172820, the user has to perform the foreign substance removal operation using the cleaning mode or the like in advance. Then, in spite of the operation, depending on the type of the foreign substance, the foreign substance may not be removed.

The present invention has been made to solve the above-mentioned problems, and is directed to effectively preventing deterioration in image quality due to a foreign substance that exists on an optical element such as an optical low-pass filter disposed in front of an image sensor and that is captured in a shot image.

SUMMARY OF THE INVENTION

The present invention is directed to an imaging apparatus capable of changing a relative position of a position of a foreign substance adhered to an optical element and a position of a predetermined area of an object based on a comparison result of the positions.

According to an aspect of the present invention, an imaging apparatus includes an image sensor configured to photoelectrically convert an image of an object formed by an imaging lens to generate an image signal, a foreign substance information detection unit configured to detect foreign substance information including at least information about a position of a foreign substance adhered to an optical element disposed in front of the image sensor, a determination unit configured to determine whether the position of the foreign substance detected by the foreign substance information detection unit overlaps a predetermined area of the object by analyzing the image signal of the object generated by the image sensor, and a changing unit configured to change a relative position of the image of the object formed on the image sensor and the image sensor when the determination unit determines that the position of the foreign substance overlaps the predetermined area.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 is a block diagram illustrating an electric configuration of the imaging apparatus according to the first exemplary embodiment of the present invention.

DETAILED DESCRIPTION OF THE EMBODIMENTS

Various exemplary embodiments, features, and aspects of the invention will be described in detail below with reference to the drawings.

Figure 1:
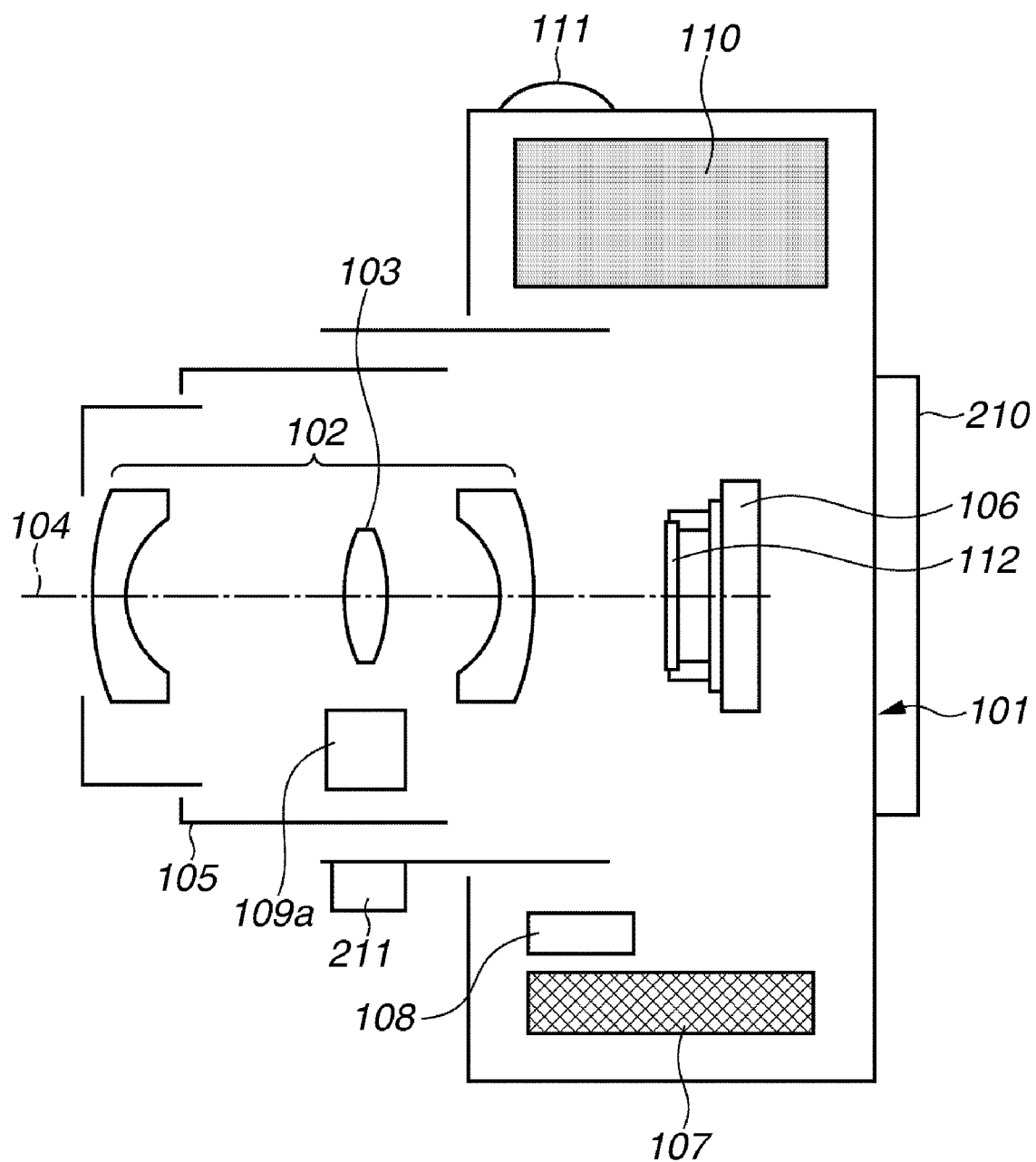
FIG. 1 illustrates a configuration of an imaging apparatus according to a first exemplary embodiment of the present invention.

FIG. 1 is a block diagram illustrating a configuration of an imaging apparatus according to a first exemplary embodiment of the present invention.

In FIG. 1, an imaging apparatus (hereinafter, referred to as a camera) 101 such as a digital camera forms an object image in the vicinity of an image sensor 106 using an imaging optical system 102 and a focus adjustment unit (not shown). The imaging optical system 102 includes an optical axis 104. The imaging optical system 102 is housed in a lens barrel 105.

In front of the image sensor 106, a filter 112 formed by integrating an infrared absorbing filter for substantially matching a luminosity factor of the image sensor 106 with a human luminosity factor and a low-pass filter for false color prevention is disposed. When a foreign substance such as dust adheres on the filter 112, the foreign substance is captured as a shadow on an image obtained by the image sensor 106.

The image sensor 106 photoelectrically converts an object image formed by the imaging optical system 102. Further, the image sensor 106 acquires an image signal from the image sensor 106 in synchronization with an operation of a release button 111 by a user, and records the signal in an external memory 107, for example, CompactFrash®.

In a mode for performing a camera-shake correction, during exposure, displacement of the image due to camera shake is corrected by driving a camera-shake correction lens 103 by a drive unit 109a based on a signal output from a camera-shake detection sensor 108.

During framing operation before main shooting, by continuous thinning reading operation of the image sensor 106, an actual real-time image is displayed on a display unit 210 (e.g., a thin film transistor (TFT) liquid crystal display).

Using a switch 211, ON and OFF of the camera-shake correction operation can be set. The switch 211 can also set valid or invalid of frame movement operation in which an image frame is moved by driving the camera-shake correction lens 103 in order to make the foreign substance adhered on the filter 112 less noticeable. Electric power is supplied to circuits in the camera from a power supply 110.

FIG. 2 is a block diagram illustrating an electric configuration of the camera 101.

In FIG. 2, the camera 101 includes, for example, an imaging system, an image processing system, a record/reproduction system, and a control system.

The imaging system includes the imaging optical system 102 and the image sensor 106. The image processing system includes an analog-to-digital (A/D) converter 201 and an image processing circuit 202. The record/reproduction system includes a record processing circuit 203 and the external memory 107.

The control system includes a camera system control circuit 205, an automatic focus (AF) sensor 206, an automatic exposure (AE) sensor 207, the camera-shake detection sensor 108, an operation detection circuit 208, and a lens system control circuit 209.

The control system further includes a position detection sensor 204 that detects a position of the camera-shake correction lens 103. The lens system control circuit 209 includes the drive unit 109a that drives the camera-shake correction lens 103.

The imaging system forms an image of light emitted from an object on an imaging surface of the image sensor 106 via the imaging optical system 102. In the imaging system, based on a signal of the AE sensor 207, using a diaphragm (not shown) or the like, the object light of an appropriate amount is exposed on the image sensor 106.

The image processing circuit 202 processes an image signal corresponding to the pixels of the image sensor 106 received from the image sensor 106 via the A/D converter 201. The image processing circuit 202 includes a white balance circuit, a gamma correction circuit, and an interpolation calculation circuit that changes a resolution to a high resolution by interpolation calculation.

The record processing circuit 203 performs output of an image signal to the external memory 107, and generates an image to be output to the display unit 210. The record processing circuit 203 further performs compression of an image or a moving image using a known method.

The operation detection circuit 208 detects operation of the release button 111. The camera system control circuit 205 controls each unit in response to a detection signal of the operation detection circuit 208. More specifically, for example, the operation detection circuit 208 generates and outputs a timing signal when shooting.

The AF sensor 206 detects a focus state of the imaging apparatus 101. The AE sensor 207 detects luminance of an object. The camera-shake detection sensor 108 detects camera shake.

The lens system control circuit 209 controls a lens or the like in response to a signal of the camera system control circuit 205. Further, the lens system control circuit 209 drives the camera-shake correction lens 103 using the internal drive unit 109a.

The control system controls each of the imaging system, the image processing system, and the record/reproduction system in response to external operation. For example, the control system detects the pressing of the release button 111 to control the drive of the image sensor 106, the operation of the image processing circuit 202, the compression processing in the record processing circuit 203, or the like.

Further, the control system controls states of each segment in an information display device that performs indication of information on an optical finder, a liquid crystal monitor, or the like using the display unit 210.

To the camera system control circuit 205, the AF sensor 206 and the AE sensor 207 are connected. Based on signals of the AF sensor 206 and the AE sensor 207, the camera system control circuit 205 controls lenses and a diaphragm. To the camera-system control circuit 205, the camera-shake detection sensor 108 is connected. When a mode for performing camera-shake correction is set by the switch 211, based on a signal output from the camera-shake detection sensor 108 and calculation result in the camera system control circuit 205, the drive unit 109$a$ drives the camera-shake correction lens 103.

The setting of the switch 211 is notified to the camera system control circuit 205 via the lens system control circuit 209. The camera system control circuit 205 includes an internal memory 212 that stores various control parameters of the camera or temporarily stores image data.

Figure 3A:
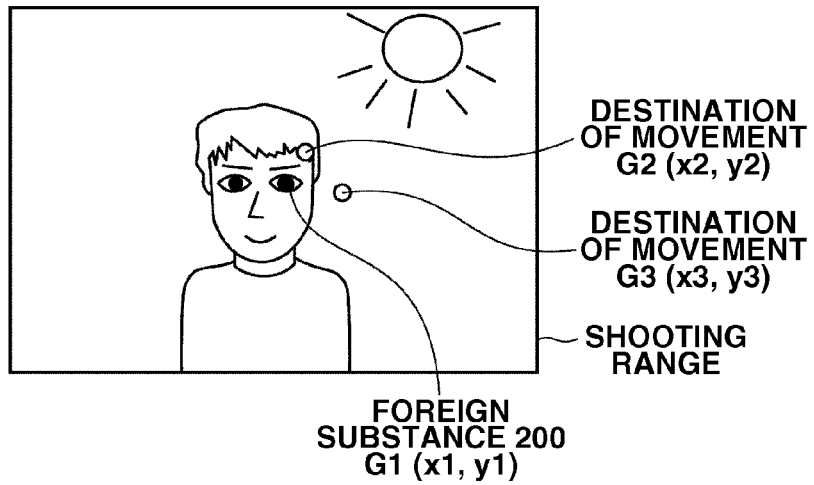
FIG. 3A illustrates an image frame according to the first and a second exemplary embodiments of the present invention.
Figure 3B:
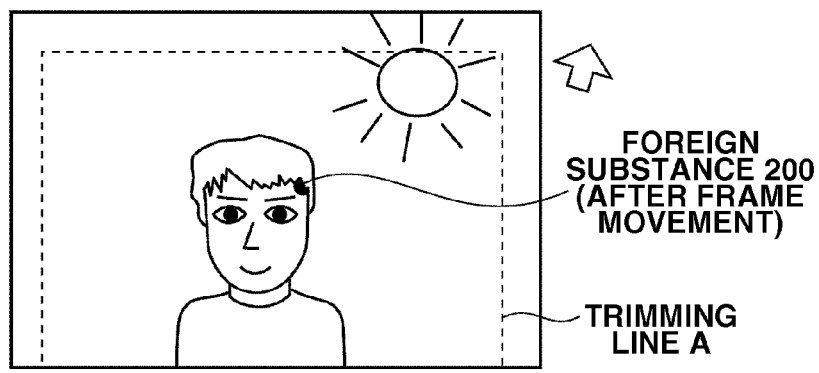
FIG. 3B illustrates an image frame according to the first and second exemplary embodiments of the present invention.
Figure 3C:
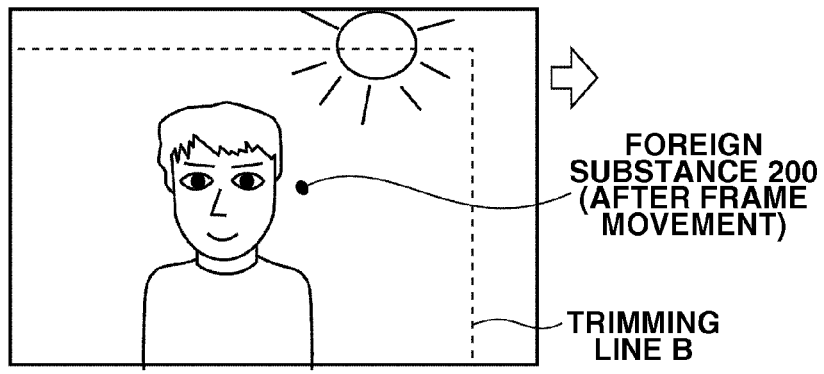
FIG. 3C illustrates an image frame according to a third exemplary embodiment of the present invention.

FIGS. 3A to 3C illustrate frame movement operation (composition change operation) in which a shadow of a foreign substance existing in the vicinity of the image sensor is moved so that the shadow captured in an image frame becomes less noticeable in the image frame.

In FIG. 3A, a large foreign substance 200 adheres to the filter 112 that is disposed in front of the image sensor 106. In the state, the shadow of the foreign substance appears over a main object, and the state is extremely undesirable in view of the quality of the picture.

To solve the problem, by moving coordinates G1 (x1, y1) of the shadow of the foreign substance 200 on the image sensor 106 to a coordinate position where the shadow is less noticeable in the shooting frame, the quality of the picture can be improved.

In order to move the image of the shadow, the camera-shake correction lens 103 in the imaging optical system 102 is moved in X and Y directions by the drive unit 109$a$, or the image sensor 106 itself is moved in the X and Y directions. By the operation, the relative positional relationship between the shooting frame and the image sensor 106 can be changed.

As illustrated in FIG. 3A as movement destination coordinates G2 (x2, y2), it is effective to move the image of the shadow to a relatively low luminance area such as hair of a person near the coordinates of the shadow.

FIG. 3B illustrates an image frame after the frame movement operation is implemented by operating the camera-shake correction lens 103. To prevent a problem due to a movable range of the camera-shake correction lens or the like and change in the relationship between the main object and the entire image frame, it is preferable to minimize the amount of the frame movement.

Information (foreign substance information) about the size and position of the foreign substance in FIG. 3A and darkness of the shadow of the foreign substance captured by the image sensor 106 can be acquired by the photographer at any timing by a foreign substance information detection processing (detection processing of a pixel position where defective image is generated by the foreign substance) that is described below.

The foreign substance information is stored in the internal memory 212 before the field is actually shot and the information can be read any time if necessary.

Figure 4:
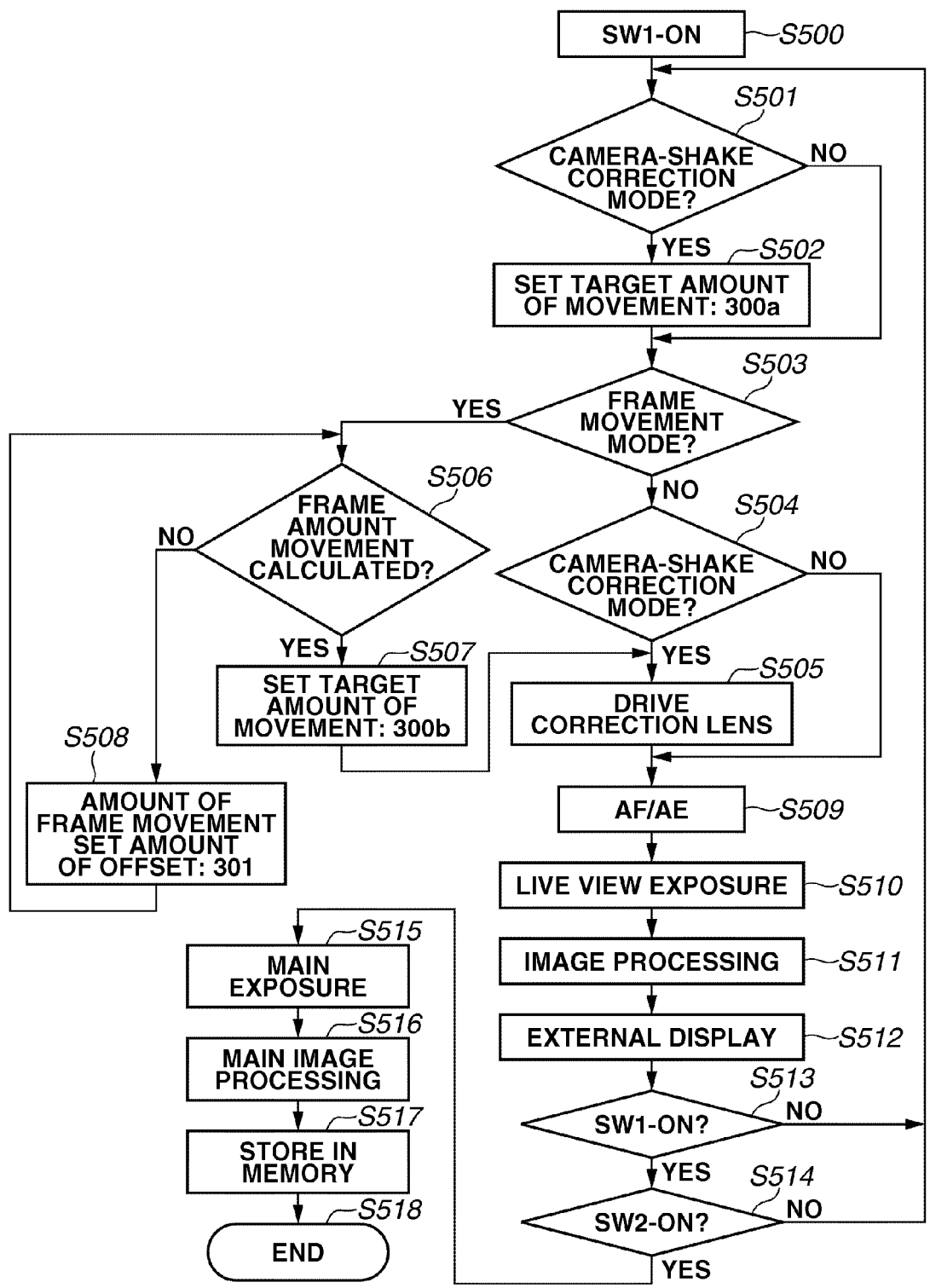
FIG. 4 is a flowchart illustrating operation of the imaging apparatus according to the first exemplary embodiment of the present invention.

Imaging operation of the camera according to the first exemplary embodiment is described with reference to FIG. 4. FIG. 4 is a flowchart illustrating the imaging operation according to the first exemplary embodiment of the present invention. The imaging operation is described step by step in FIG. 4.

The user can select, using the switch 211, ON and OFF of the camera-shake correction operation, and ON and OFF of frame movement operation in which a foreign substance, which is captured in an image frame, is moved to an area where the foreign substance is less noticeable in the image frame. The operation is characteristic in the first exemplary embodiment.

That is, as the types of the modes, there are the following four modes.

(1) Camera-shake correction is set and frame movement is not set, (2) Camera-shake correction is set and frame movement is set, (3) Camera-shake correction is not set and frame movement is set, and (4) Camera-shake correction is not set and frame movement is not set.

In step S500, the camera system control circuit 205 receives a shooting preparation operation start signal (SW1-ON) that is generated by a half press operation of the release button 111.

In step S501, the camera system control circuit 205 determines whether the camera-shake correction mode is set. When the camera-shake correction is performed (YES in step S501), in step S502, the camera system control circuit 205 calculates a target value for normal camera shake, that is, a target amount of movement (300$a$).

Then, in step S503, the camera system control circuit 205, which can make the foreign substance less noticeable, determines whether the frame movement mode is set. When the frame movement mode is not set (NO in step S503), in step S504, the camera system control circuit 205 determines whether the camera-shake correction mode is set again.

When the camera system control circuit 205 confirms that the camera-shake correction mode is set (YES in step S504), in step S505, the camera system control circuit 205 drives the camera-shake correction lens 103 based on the target amount of movement (300$a$). In steps S509 to S514, the camera system control circuit 205 executes a live view sequence in a state the camera shake correction is being performed.

When the camera-shake correction is not performed in step S501 (NO in step S501), or the frame movement mode is not set in step S503 (NO in step S503), the camera system control circuit 205 executes the following live view sequence without performing driving of the correction lens in step S505.

The live view sequence performed after step S509 is described. In step S509, the camera system control circuit 205 performs AF/AE operation. More specifically, based on signals acquired from the AF sensor 206 and the AE sensor 207, the camera system control circuit 205 performs focusing via the lens system control circuit 209 or the like, and performs diaphragm adjustment and exposure time adjustment.

In step S510, an object image is exposed on the image sensor 106. Then, a photoelectrically-converted image signal is read from the image sensor 106. The signal is A/D-converted in the A/D converter 201 to a digital signal. In step S511, the digital signal is image-processed by the image processing circuit 202.

More specifically, known image processing such as gamma correction, white balance correction, and compression processing is performed. In step S512, the captured image is displayed on the display unit 210 via the internal memory 212.

In step S513, the camera system control circuit 205 checks the SW1-ON signal. When the SW1-ON signal is interrupted (NO in step S513), the processing returns to step S500, and the camera system control circuit 205 waits until the SW1-ON signal is generated again.

The above-described operation is performed to display the image frame on the display unit 210 to provide the frame image for the photographer to determine a shooting composition before a main shooting.

On the image signal of the image sensor 106, the thinning processing of the read pixels is performed. Therefore, the amount of the image information is smaller than that of an image signal at main shooting described below. Accordingly, on the display unit 210, it is possible to perform real time display of the field image before the main shooting at a high refresh rate of 60 frames/sec. The above-described display is so-called live view display.

Meanwhile, returning to step S503, when the camera is set to the frame movement mode (YES in step S503), in step S506, the camera system control circuit 205 determines whether an amount of movement of image frame for making the foreign substance on the image sensor less noticeable is calculated. The method for the calculation of the amount of frame movement is described below.

When the amount of frame movement is not calculated (NO in step S506), in step S508, the camera system control circuit 205 calculates an offset amount 301 (i.e., the amount of frame movement). Then, the processing returns to step S506.

In step S506, when the frame movement amount has been calculated in step S508 (YES in step S506), the processing proceeds to step S507. In step S507, the camera system control circuit 205 adds the offset amount 301 calculated in step S508 to the target amount of movement (300a) for camera-shake correction calculated in step S502, and a final target amount of movement (300b) is set.

To the final target amount of movement (300b), the camera-shake correction lens drive in step S505 is performed. In step S501, when the camera-shake correction mode is not set, the target amount of movement (300a) is not set. Accordingly, when "Camera-shake correction is not set and frame movement is set, the final target amount of movement (300b) of the camera-shake correction lens 103 corresponds to the amount of frame movement (i.e., offset amount 301).

As described above, while the camera system control circuit 205 is detecting the SW1-ON signal, in the state where the camera-shake correction is set and the camera-shake correction lens 103 is driven for the frame movement, the image frame display on the display unit 210 can be repeatedly performed.

In step S514, when the photographer views the display unit 210 and further presses the release button 111 to perform shooting of the still image, a trigger signal SW2-ON is generated (YES in step S514). In steps S515 and S516, with respect to exposure output of the all pixels on the image sensor 106, image processing similar to the above-mentioned image processing such as the gamma correction, the white balance correction, the compression processing and the like is performed, and an image file is generated.

In step S517, the record processing circuit 203 records the generated image file in the external memory 107. Then, in step S518, the series of shooting sequence ends.

Meanwhile, it is known that as an F-number at shooting becomes smaller (close to open), blur of a foreign substance becomes larger and less noticeable. Accordingly, even if the camera is set to the frame movement mode, if a value of the diaphragm is a predetermined value or less, the frame movement operation may not be performed.

For example, it is appropriate to set the value of the diaphragm to around F8, and if the camera is set to a diaphragm-priority shooting mode in which the value is set to a diaphragm of an open side than the F8, or a manual shooting mode, the frame movement operation may be canceled.

The method of setting the offset amount 301 (i.e., an amount to move a frame) when the image frame is moved to make a shadow of a foreign substance on the image sensor less noticeable performed in step S508 in FIG. 4 is described with reference to FIGS. 5, 6A, and 6B.

Figure 5:
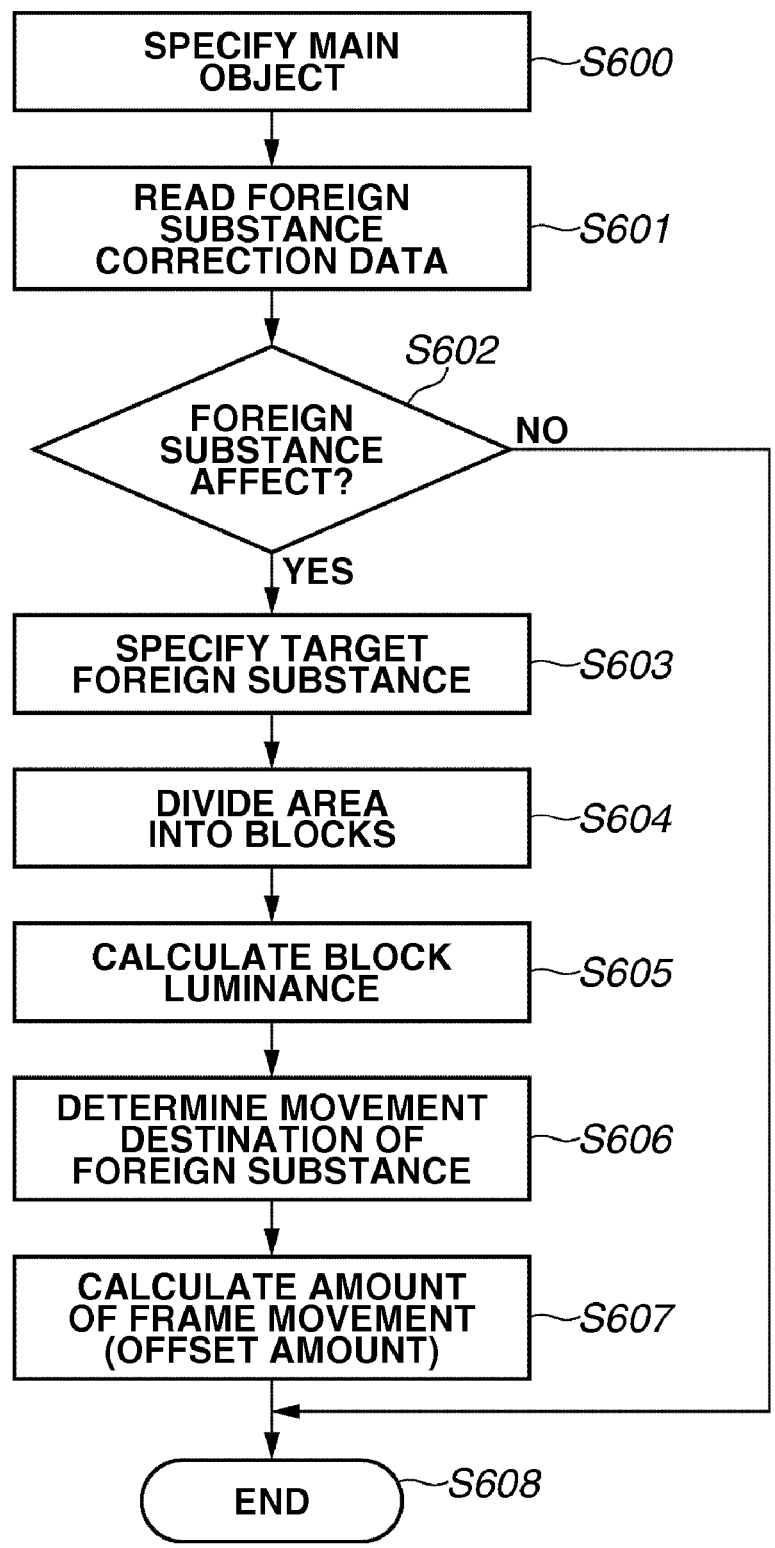
FIG. 5 is a flowchart illustrating operation of frame movement according to the first exemplary embodiment of the present invention.

In FIG. 5, first, a main object is specified based on the output of the AF sensor 206. The AF sensor 206 is configured to obtain ranging information to a plurality of field areas. Accordingly, based on the plurality of pieces of ranging information, using a known closest point algorism, a position of the main object to be shot can be specified.

Even if a dedicated AF sensor is not used, in step S600, it is possible to accurately specify the main point including the size by detecting positions of the eyeballs on the face of the object or detecting the color of skin from output of the image sensor 106 during live view.

In step S601, the camera system control circuit 205 reads the information (foreign substance correction data) of the foreign substance adhered in the vicinity of the image sensor of the camera stored in the internal memory 212 by the foreign substance information detection processing performed before the shooting.

In step S602, the camera system control circuit 205 determines whether the acquired positional coordinates of the foreign substance are within the area of the main object (especially, the face of the person). When the camera system control circuit 205 determines that the foreign substance is not within the area of the main object, that is, the foreign substance does not affect the shooting (NO in step S602), the camera system control circuit 205 determines that there is no target foreign substance to perform the frame movement. Then, the processing proceeds to step S608 and the processing ends.

In step S602, when the camera system control circuit 205 determines that the foreign substance is within the area of the main object and affects the shooting (YES in step S602), the camera system control circuit 205 specifies the foreign substance as a target foreign substance to perform the frame movement.

In the step, if a plurality of target foreign substances exist, only one foreign substance is selected considering each size and amount (darkness of an image of a foreign substance to the surrounding image) of pixel output decrease from the foreign substance information acquired from the internal memory 212. In step S603, a coordinate system (pixel coordinates) on the image sensor is set. In the example, it is assumed that the coordinates are G1 (x1, y1) in FIG. 6A.

Figure 6A:
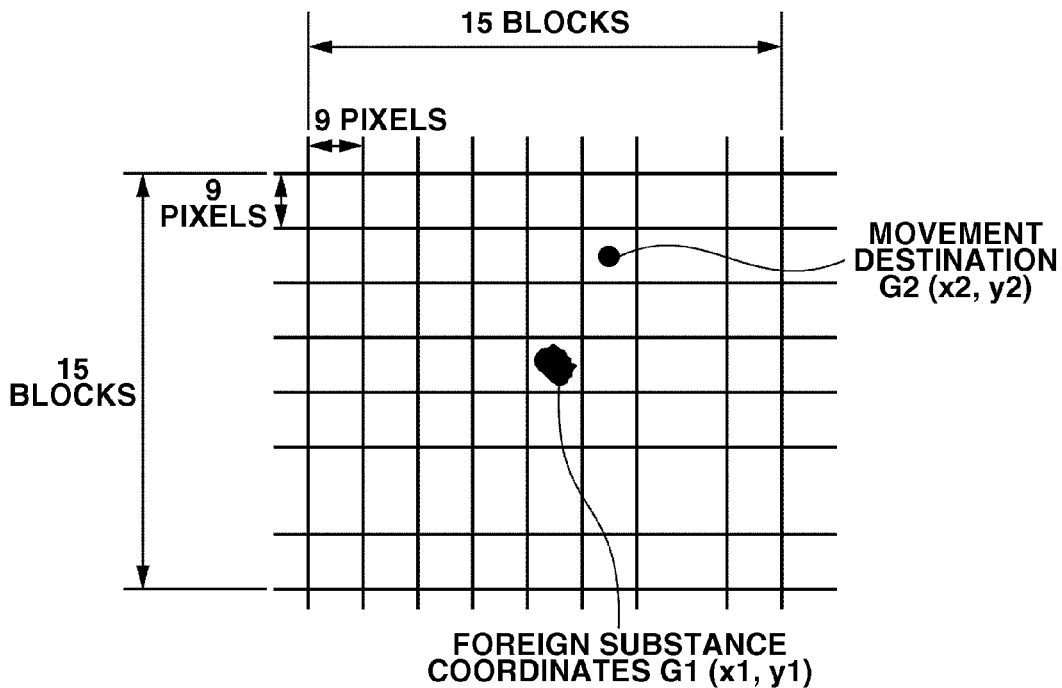
FIG. 6A illustrates calculation of an amount of frame movement according to the first exemplary embodiment of the present invention.

When the target foreign substance is determined, as illustrated in FIG. 6A, in step S604, the pixel coordinates of the foreign substance on the image sensor read from the internal memory 212 are set as a center, for example, the pixels of the image sensor 106 are divided such that a block contains 15×15 small blocks of 9 pixels×9 pixels.

In step S605, pixel output belonging to the one divided block is averaged. Based on the result, a fine luminance distribution in the vicinity of the foreign substance is measured (field analysis, luminance distribution detection).

Figure 6B:
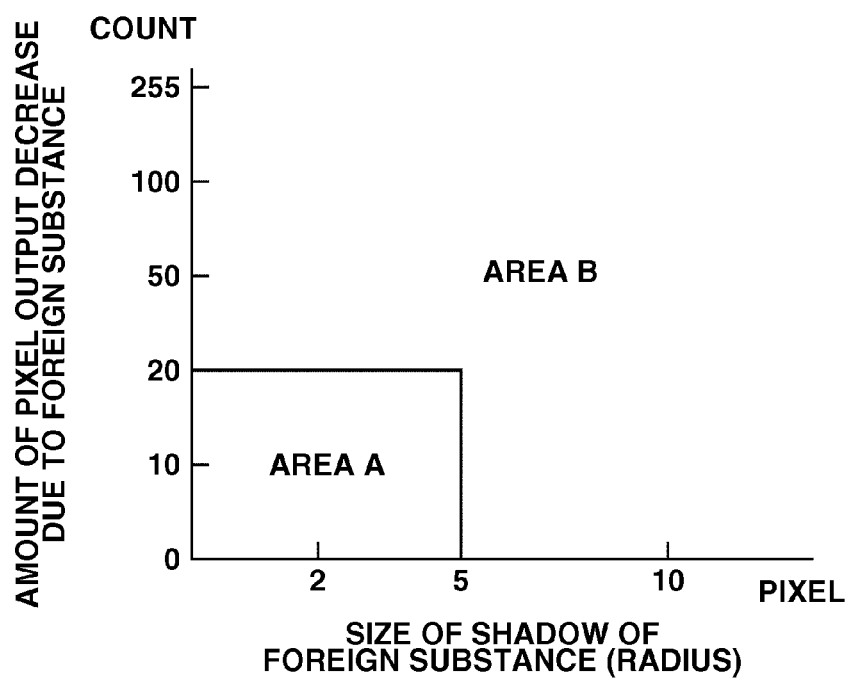
FIG. 6B illustrates calculation of an amount of frame movement according to the first exemplary embodiment of the present invention.

Then, in step S606, based on the size and the pixel output decrease amount acquired from the internal memory 212, as illustrated in FIG. 6B, when it is determined that a diameter of the foreign substance is five pixels or less and the output decrease amount is 20 counts or less of the peripheral pixels, within the above-described 15×15 block, in an area of 8×8 block, a block that has a lowest luminance is selected (area A in FIG. 6B).

On the other hand, in step S606, when the diameter of the foreign substance is six pixels or more and the output decrease amount is 21 counts or more of the peripheral pixels (up to 255 counts by 8-bit processing), within all of the 15×15 block (area A and area B in FIG. 6B), a block that has a lowest luminance is selected.

The processing is performed to make a shadow of a greatly noticeable foreign substance less noticeable when shooting is performed. To this end, an area for comparing luminance is widened even though a distance to move the shadow in the frame becomes long in order to move the shadow to an area where the field luminance is low as much as possible.

The central coordinates of the block selected in the processing are G2 (x2, y2) in FIG. 6A that are to be a destination coordinate point of the frame movement. An offset amount 301 (δ) for the frame movement can be obtained by the following equation using the foreign substance coordinates G1 (x1, y1) and the frame movement destination coordinates G2 (x2, y2).

$$\delta=\sqrt{\{(x2-x1)^2+(y2-y1)^2\}}$$

However, actual camera-shake correction and operation control of the frame movement is performed by moving the camera-shake correction lens 103 on two axes of x and y within a surface perpendicular to the optical axis 104 as described below. Accordingly, δx=x2−x1, δy=y2−y1 is an actual control amount.

Figure 7:
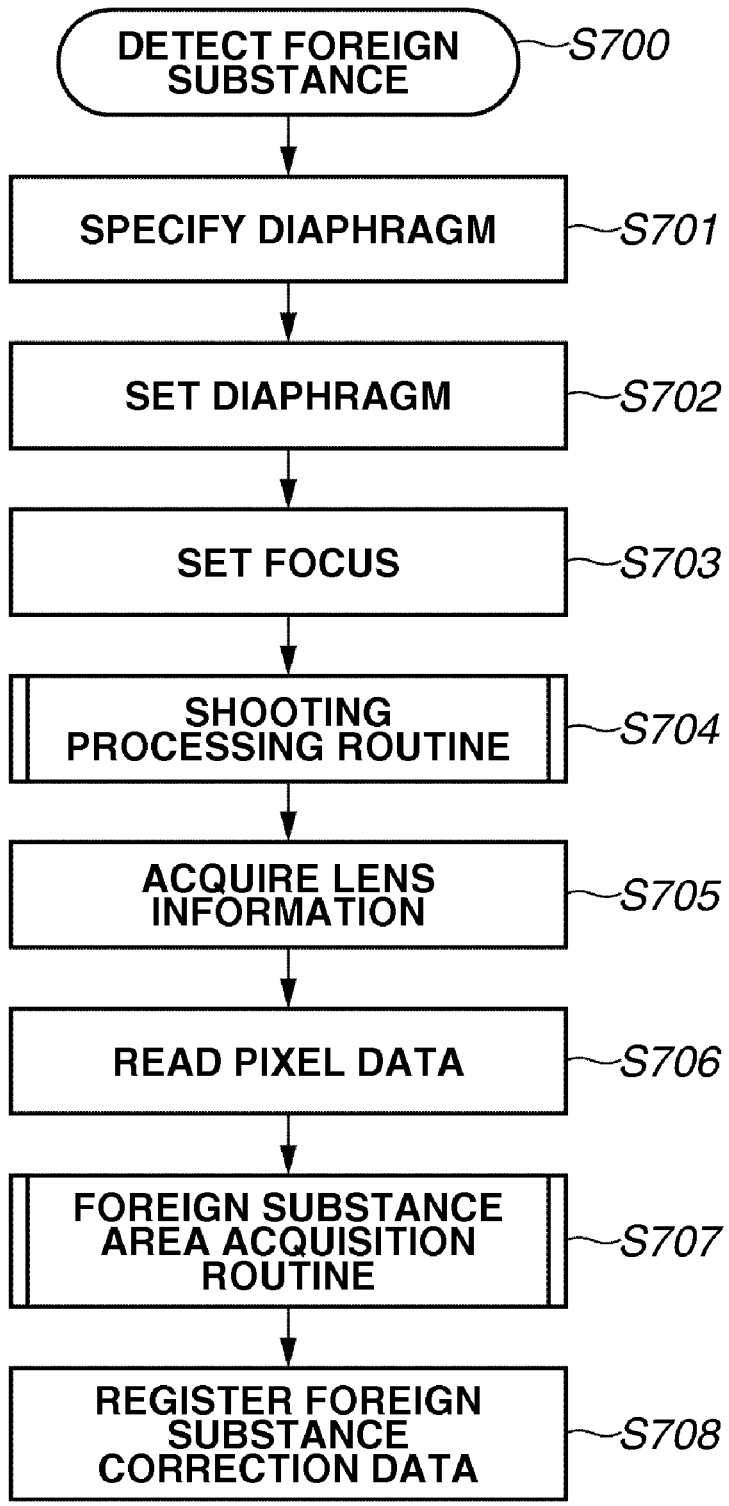
FIG. 7 is a flowchart illustrating foreign substance detection routine according to the first exemplary embodiment of the present invention.

FIG. 7 is a flowchart illustrating foreign substance detection processing (detection processing of a pixel position where image defective occurs due to a foreign substance) performed in the camera according to the first exemplary embodiment. The processing is performed by executing a foreign substance detection processing program stored in the internal memory 212 by the camera system control circuit 205. The foreign substance detection processing must be performed before the photographer performs main shooting of a field.

The foreign substance detection processing is performed by acquiring a foreign substance detection image. When the foreign substance detection processing is performed, the camera is set such that the optical axis 104 of the imaging optical system 102 faces a surface such as an exit surface of a light source or a surface having a uniform color such as a white wall to prepare for shooting of the foreign substance detection image.

Alternatively, a light unit (small light source device) for foreign substance detection may be mounted on a mounting portion (not shown) for filter attachment/detachment at a tip of the imaging optical system (shooting lens) 102 to prepare for shooting of the foreign substance detection image. As a light source of the light unit, for example, a white light emitting-diode (LED) may be used. It is preferable that a size of the light-emitting face is adjusted to correspond to a predetermined diaphragm value (for example, in the first exemplary embodiment, F32).

After the preparation is completed, when start of the foreign substance detection processing is instructed, first, the camera system control circuit 205 performs setting of the diaphragm. An image forming state of a foreign substance in the vicinity of the image sensor is varied depending on a diaphragm value of the lens, and the position is varied depending on a position of a pupil of the lens. Accordingly, in addition to positions and sizes of the foreign substance, it is necessary that the foreign substance correction data includes the diaphragm value and the pupil position of the lens at the shooting for the foreign substance detection image.

However, in the step of generating the foreign substance correction data, if it is determined in advance that the same diaphragm value is always used, it is not always necessary to hold the diaphragm value in the foreign substance correction data. Regarding to the pupil position, by using the light unit, similarly, it is not always necessary to hold the pupil position in the foreign substance correction data.

That is, in the step of generating the foreign substance correction data, when the diaphragm value to be used is changed, it is necessary to hold the diaphragm value and the pupil position of the lens at the detection of the foreign substance correction data. In the exemplary embodiment, the pupil position means a distance of an exit pupil from an imaging plane (focal plane).

For example, in the exemplary embodiment, in step S701, F32 is specified.

In step S702, the camera system control circuit 205 instructs the lens system control circuit 209 to perform diaphragm blade control of the imaging optical system (shooting lens) 102 and sets the diaphragm to the diaphragm value specified in step S701. Further, in step S703, the camera system control circuit 205 sets a focus position to infinity.

When the diaphragm value and the focus position of the shooting lens are set, in step S704, the camera system control circuit 205 performs shooting in the foreign substance detection mode. The imaging processing routine performed in step S704 is similar to the processing described above with reference to FIG. 4. The shot image data is stored in the internal memory 212.

When the shooting is finished, in step S705, the camera system control circuit 205 acquires the diaphragm value and the lens pupil position at the shooting.

In step S706, the image processing circuit 202 reads data stored in the internal memory 212 and corresponding to each pixel of the shot image. In step S707, the image processing circuit 202 performs foreign substance area acquisition routine illustrated in FIG. 8 that is described below, and acquires a position of the pixel where the foreign substance exists, a size, and an amount of output decrease thereof relative to those of peripheral pixels.

Hereinafter, the foreign substance area acquisition routine illustrated in FIG. 7 is described with reference to FIG. 8.

The image data acquired for the foreign substance detection processing is expanded on the memory, and the processing is performed on each predetermined block unit.

Figure 8:
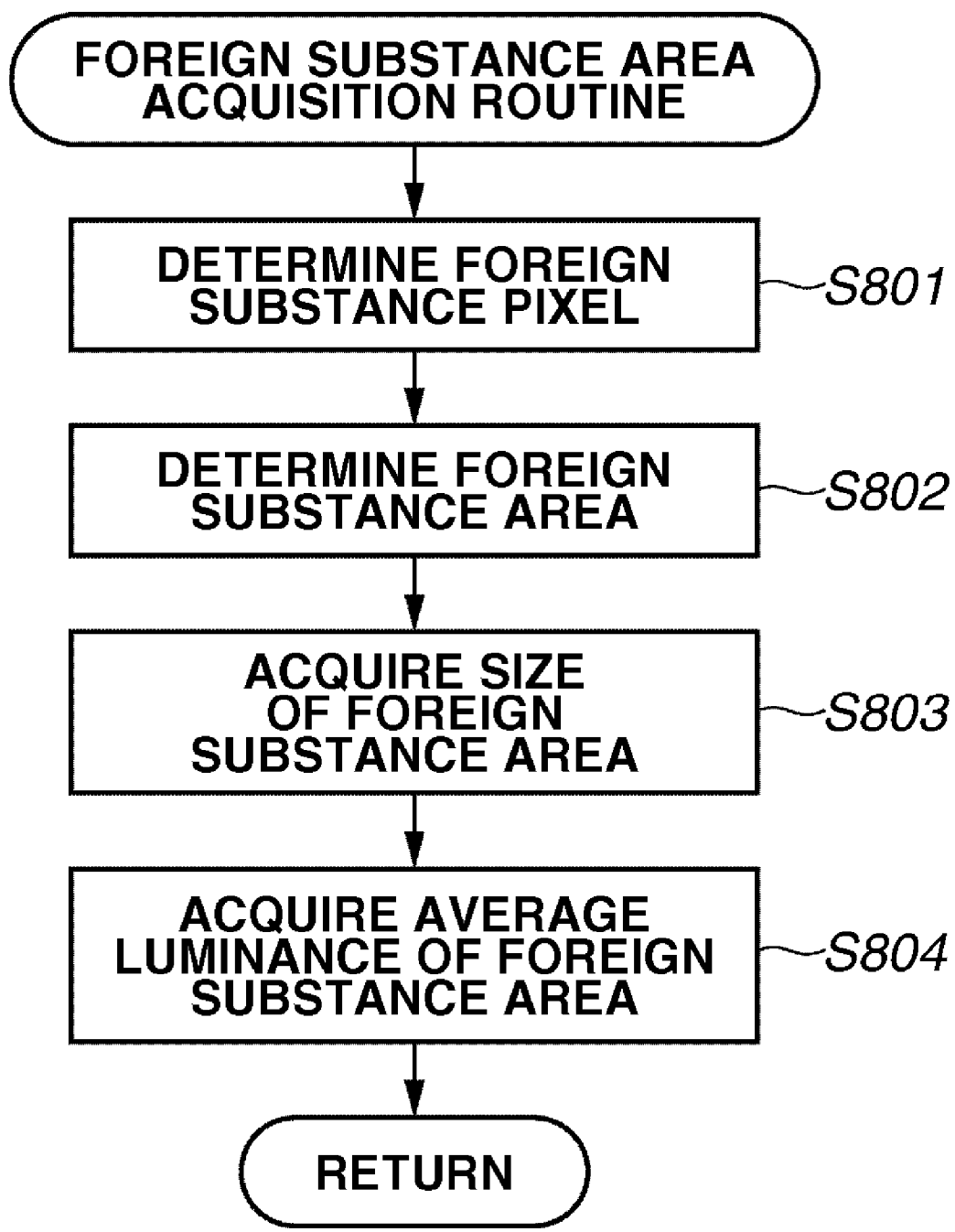
FIG. 8 is a flowchart illustrating foreign substance area acquisition routine according to the first exemplary embodiment of the present invention.

Foreign substance area determination in the block is performed according to the flow illustrated in FIG. 8. First, in step S801, a maximum luminance Lmax and an average luminance Lave in the block are calculated, and a threshold T1 in the block is calculated using the following equation.

$$T1=Lave \times 0.6 + Lmax \times 0.4$$

Then, pixels that do not exceed the threshold are determined as foreign substance pixels.

In step S802, isolated areas formed by the foreign substance pixels are defined as individual foreign substance areas di (i=0, 1, . . . , n). In step S803, in each of the foreign substance areas, a maximum value Xmax and a minimum value Xmin of a coordinate in a horizontal direction and a maximum value Ymax and a minimum value Ymin of a coordinate in a vertical direction of the pixels that form the foreign substance area are calculated, and a radius ri that indicates a size of the foreign substance area di is calculated by the following equation.

$$ri=\sqrt{((X\text{max}-X\text{min})/2)^2+((Y\text{max}-Y\text{min})/2)^2}$$

In step S804, an average luminance value of each foreign substance area is calculated. By the operation, a difference between an area adjacent to the foreign substance area, that is, the amount of output decrease can also be calculated.

Returning to FIG. 7, in step S708, the camera system control circuit 205 registers the position, size, output value of the pixel where the foreign substance exists acquired in step S707 and the diaphragm value and the lens pupil position information acquired in step S705 in the internal memory 212 as the foreign substance correction data.

More specifically, as the lens information at the shooting of the image for detection, the actual diaphragm value (F-number) and the lens pupil position at the shooting of the image for detection are stored in the storage area. In a subsequent storage area, the number (integer value) of the detected foreign substance areas is stored.

Subsequently, parameters of the individual foreign substance areas are repeatedly stored by the number of the foreign substance areas. As the parameters of the foreign substance area, four values, that is, the radius of the foreign substance, the amount of output decrease to the peripheral pixels, the central coordinate x, and the central coordinate y in the valid image area, are registered as a set.

In step S708, the camera system control circuit 205 compares a position of a defective pixel at manufacturing recorded in advance as pixel defect positional information in the internal memory 212 with the position of the read pixel data, and determines whether the pixel is a defective pixel.

Information of only a foreign substance area determined that the defect is not due to the pixel defect at manufacturing may be stored in the internal memory 212 as the foreign substance correction information.

The foreign substance correction information can be used for foreign substance removal processing described below in a second exemplary embodiment of the present invention by attaching to an image together with information at shooting of image data in normal shooting and recording in the external memory 107.

A camera shake correction system is described in detail with reference to FIGS. 9 and 10.

Figure 9:
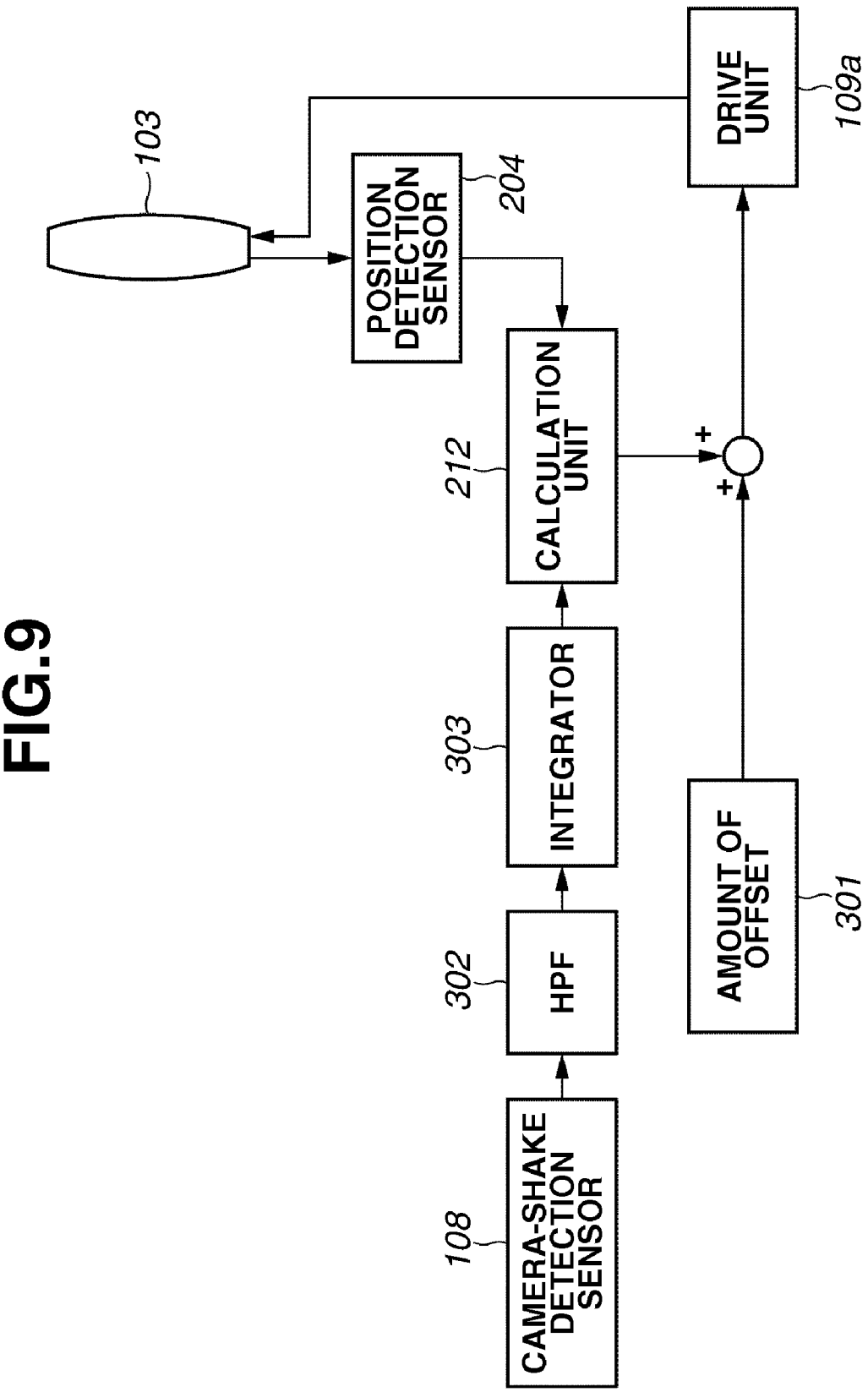
FIG. 9 is a block diagram illustrating a drive unit in a camera-shake correction lens according to the first exemplary embodiment of the present invention.

A control block of the camera shake correction system is configured as illustrated in FIG. 9. A camera-shake signal detected by the camera-shake detection sensor 108 passes through a high-pass filter (HPF) 302 that passes signals higher than a predetermined frequency, and converted into a shake amount by an integrator 303.

To the converted shake amount, a calculation unit 212 adds a detection signal from a position detection sensor 204 that detects a position of the camera-shake correction lens 103, and generates the first movement target amount 300a.

In normal camera shake correction control, based on the first movement target amount 300a, the drive unit 109a is controlled and by driving the camera-shake correction lens 103, camera shake of the user is cancelled.

In the first exemplary embodiment, further, the offset amount 301 stored in the external memory 107 is read. The offset amount 301 is added to the first movement target amount 300a, and a second movement target amount 300b is generated. Based on the second movement target amount 300b, the drive unit 109a is controlled and the camera-shake correction lens 103 is driven.

The high-pass filter 302 and the integrator 303 are provided in the camera system control circuit 205.

In the above description, the one system for the one axis for the moving direction of the camera-shake correction lens 103 has been described. However, actually, the camera-shake correction lens 103 can move within the plane perpendicular to the optical axis 104.

Accordingly, in order to move the camera-shake correction lens 103 along the two axes within the plane, it is necessary to provide two systems. Therefore, in the first exemplary embodiment, it is assumed that two systems are provided.

Figure 10:
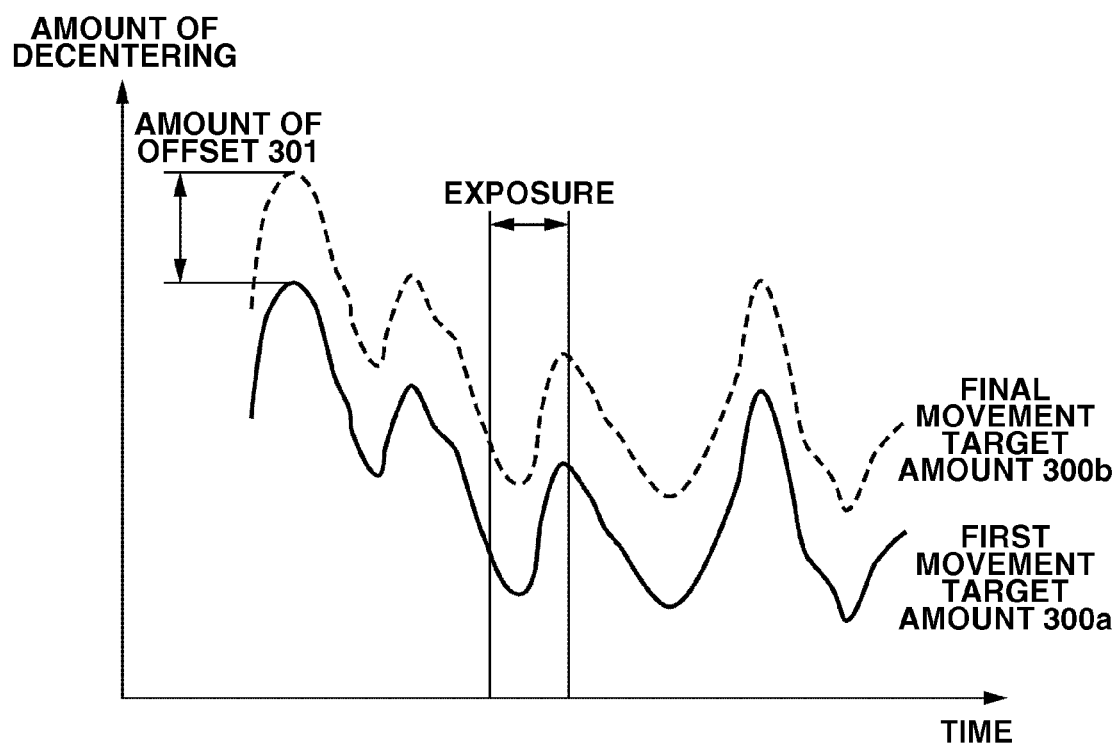
FIG. 10 is a graph illustrating operation of the camera-shake correction lens.

FIG. 10 schematically illustrates operation of the camera-shake correction lens 103 by the feedback control system in FIG. 9.

In FIG. 10, the horizontal axis represents time, and the vertical axis represents an amount of decentering from the center of an optical axis of the camera-shake correction lens 103. The solid line shows a case where the camera-shake correction lens 103 is driven according to camera shake caused by the user so that an object image is formed on the image sensor 106 centering the optical axis 104 without the movement of the target object caused by the camera-shake.

That is, the operation according to the normal camera shake correction control is illustrated, and the state where the drive unit 109a is controlled based on the first movement target amount 300a is illustrated.

On the other hand, in the first exemplary embodiment, the camera-shake correction lens 103 is driven as illustrated by the dotted line. More specifically, by adding the offset amount 301 for frame movement to the first movement target amount 300a, the final movement target amount 300b can be obtained.

In FIG. 10, the offset amount 301 is set to shift an object image upward by a predetermined amount. However, practically, within the plane, the movements of vertical direction and the horizontal direction are individually controlled. When the offset amount 301 is given and the camera-shake correction lens 103 is driven, the object image is formed on the image sensor 106 that is shifted from the optical axis 104 by an amount corresponding to the offset amount without shake.

Accordingly, from the image sensor 106, an image signal free from the camera shake and shifted by the amount corresponding to the offset amount 301 can be obtained.

Figure 11A:
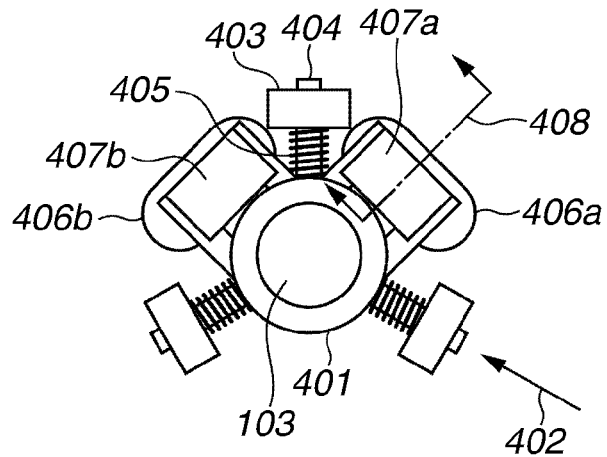
FIG. 11A illustrates a first example of a camera-shake correction mechanism according to the first exemplary embodiment of the present invention.
Figure 11B:
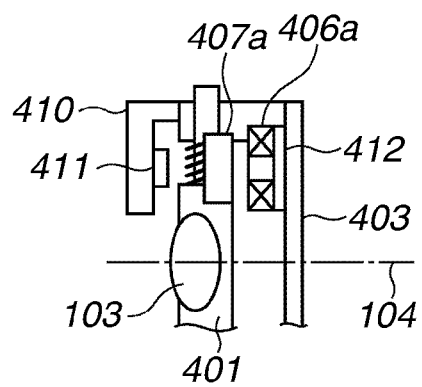
FIG. 11B illustrates the first example of the camera-shake correction mechanism according to the first exemplary embodiment of the present invention.
Figure 11C:
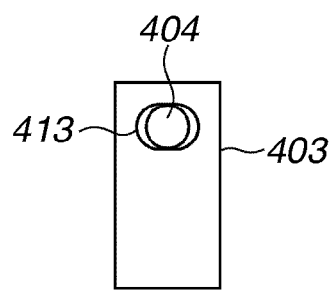
FIG. 11C illustrates the first example of the camera-shake correction mechanism according to the first exemplary embodiment of the present invention.

A mechanism for driving the camera-shake correction lens 103 is described with reference to FIGS. 11A to 11C. FIGS. 11A to 11C schematically illustrate a mechanism for moving the camera-shake correction lens 103 that is an optical system in the imaging optical system 102.

In FIG. 11A, a movable frame 401 holds the camera-shake correction lens 103. A fixed portion 403 is fixed on a barrel 105. A supporting/guiding portion 404 is provided on the movable frame 401. A spring 405 is mounted coaxially with the supporting/guiding portion 404. Coils 406a and 406b are mounted on the fixed portion 403. Magnets 407a and 407b are mounted on the movable frame 401.

FIG. 11B is a right side view illustrating the camera shake correction mechanism illustrated in FIG. 11A. Yokes 410 and 412 in FIG. 11B are not illustrated in FIG. 11A. Although a position detection sensor 411 is not illustrated in FIG. 11A, the sensor 411 detects a position of the movable portion. More specifically, the position detection sensor 411 is formed with a hall element.

FIG. 11C illustrates the camera shake correction mechanism viewed from the direction of the allow 402 in FIG. 11A. The movable frame 401 is guided and supported by the supporting/guiding portion 404 such that the movable frame 401 can perform plane motion to the fixed portion 403. In FIG. 11C, into an oval guiding groove 413, the circular supporting/guiding portion 404 is inserted.

The camera shake correction mechanism can be held in the direction of the optical axis 104 of the imaging optical system 102 and can be moved on the plane perpendicular to the optical axis 104 by configuring the three portions to have the same structure.

On the movable frame 401, the camera-shake correction lens 103 and the magnets 407a and 407b for driving the lens 103 are mounted. The movable frame 401 is elastically supported by the spring 405 that is mounted coaxially with the supporting/guiding portion 404. When driving force is not generated, the movable frame 401 is placed such that the center of the camera-shake correction lens 103 is substantially coincident with the optical axis 104.

As illustrated in FIG. 11B, a drive portion is configured such that the magnet 407a is sandwiched by the yokes and the coil 406a is provided on the one side. An operating principle of the drive portion is described with reference to FIGS. 12A and 12B.

Figure 12A:
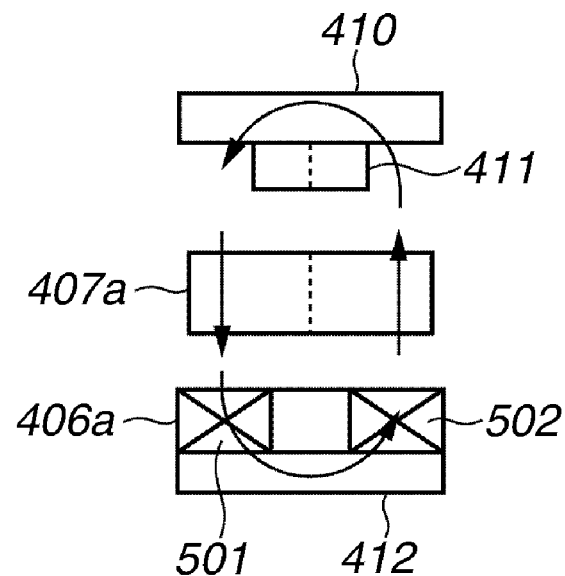
FIG. 12A illustrates a driving force generation unit in the first example of the camera-shake correction mechanism according to the first exemplary embodiment of the present invention.
Figure 12B:
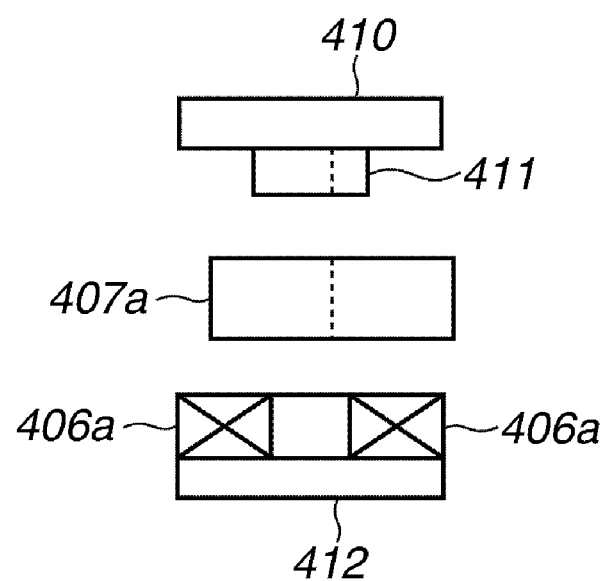
FIG. 12B illustrates the driving force generation unit in the first example of the camera-shake correction mechanism according to the first exemplary embodiment of the present invention.

FIGS. 12A and 12B illustrates a drive circuit portion taken along the dotted line 408 in FIG. 11A as a cross-section.

The drive magnet 407a has two poles, and magnetized in a thickness direction. Further, the yokes 410 and 412 are provided at both sides of the magnet 407a in the magnetization direction of the magnet 407a. Accordingly, most of the magnetic flux does not leak to the outside, and a magnetic field in the arrow direction illustrated in FIG. 12A is generated.

In this state, when an electric current is supplied to the coil 406a, in areas 501 and 502 on the coil 406a, electric currents that are opposite to each other flow. On the other hand, since directions of the magnetic fields are opposite to each other, according to Fleming's left-hand rule, force in the same direction is generated. In the state, since the coils are fixed, according to the law of action and reaction, the magnet 407a mounted on the movable portion receives the force and driven.

The driving force is proportional to the electric current of the coil 406a. By changing the direction of the electric current to supply to the coil 406a to the opposite direction, it is possible to reverse the driving force received by the magnet 407a. When the driving force is generated, since the movable frame 401 is elastically supported by the spring 405, the movable frame 401 is displaced to a point to balance with the spring force.

That is, by appropriately controlling the electric current of the coil 406a, the position of the movable frame 401 can be controlled. Further, on the yoke 410, a hall element 411 is mounted.

As illustrated in FIG. 12B, when the magnet 407a is displaced by driving force generated by application of the electric current to the coil 406a, magnetic balance on the hall element 411 also changes. Accordingly, by acquiring a signal of the hall element 411, the position of the magnet 407a can be detected.

In FIGS. 11A to 11C, 12A, and 12B, the exemplary embodiment of the moving magnet method in which the magnet is disposed on the movable portion and the coil is disposed on the fixed portion has been described. However, the present invention can be applied to an imaging apparatus provided with a moving coil method having a coil on a movable portion and a magnet on a fixed portion, or camera-shake correction mechanisms using the other driving methods.

Hereinafter, different from the above-described camera-shake correction system that moves the camera-shake correction lens 103 (i.e., a portion of the shooting lens), a system that performs camera-shake correction by moving (shifting) the image sensor 106 itself is described.

Figure 13:
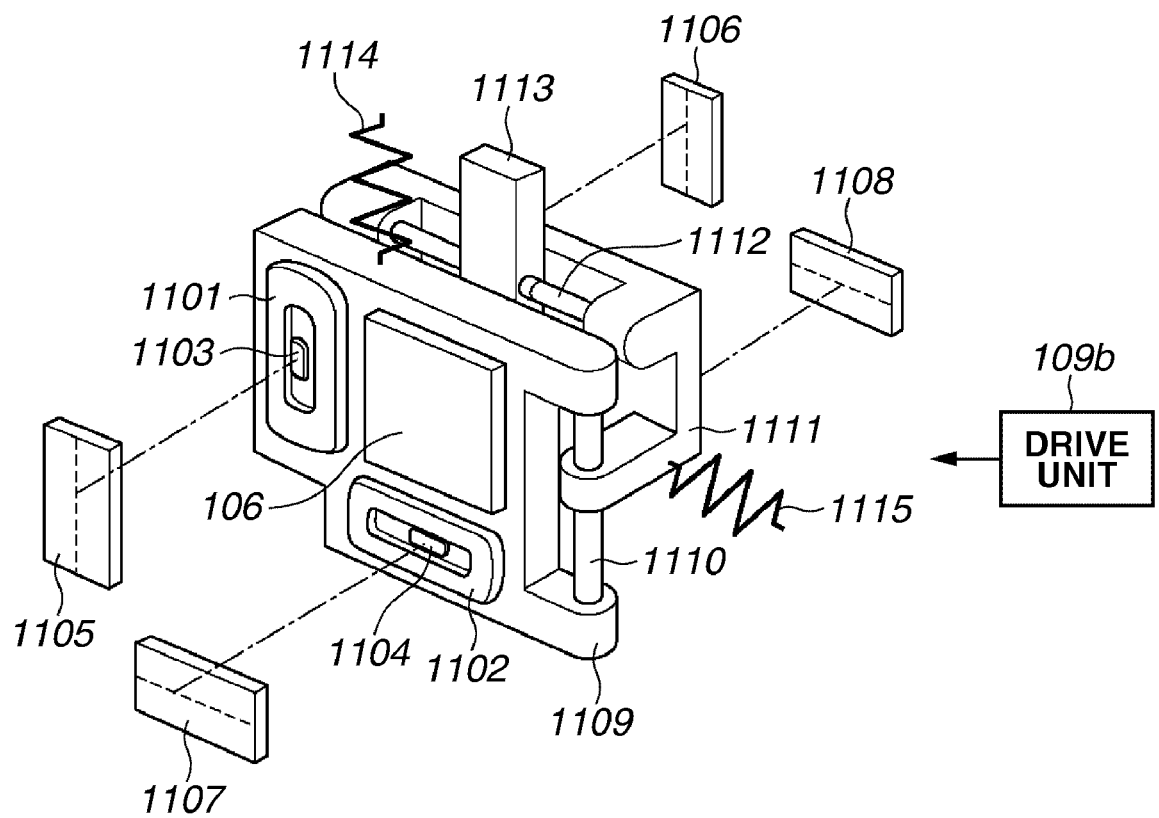
FIG. 13 is a perspective view illustrating a second example of the camera-shake correction mechanism according to the first exemplary embodiment of the present invention.

FIG. 13 illustrates a configuration of a periphery of the image sensor according to the exemplary embodiment of the present invention. In the drawing, a drive unit 109b for camera-shake correction is provided in the vicinity of the image sensor 106. The drive unit 109b shift-drives the image sensor 106.

For this purpose, the switch 211 that performs setting of valid or invalid of the mode for implementing the camera-shake correction and valid or invalid of foreign substance correction is provided on the imaging apparatus 101 side. The other configurations are similar to those in the above-described example of the camera-shake correction using the camera-shake correction lens.

Figure 14:
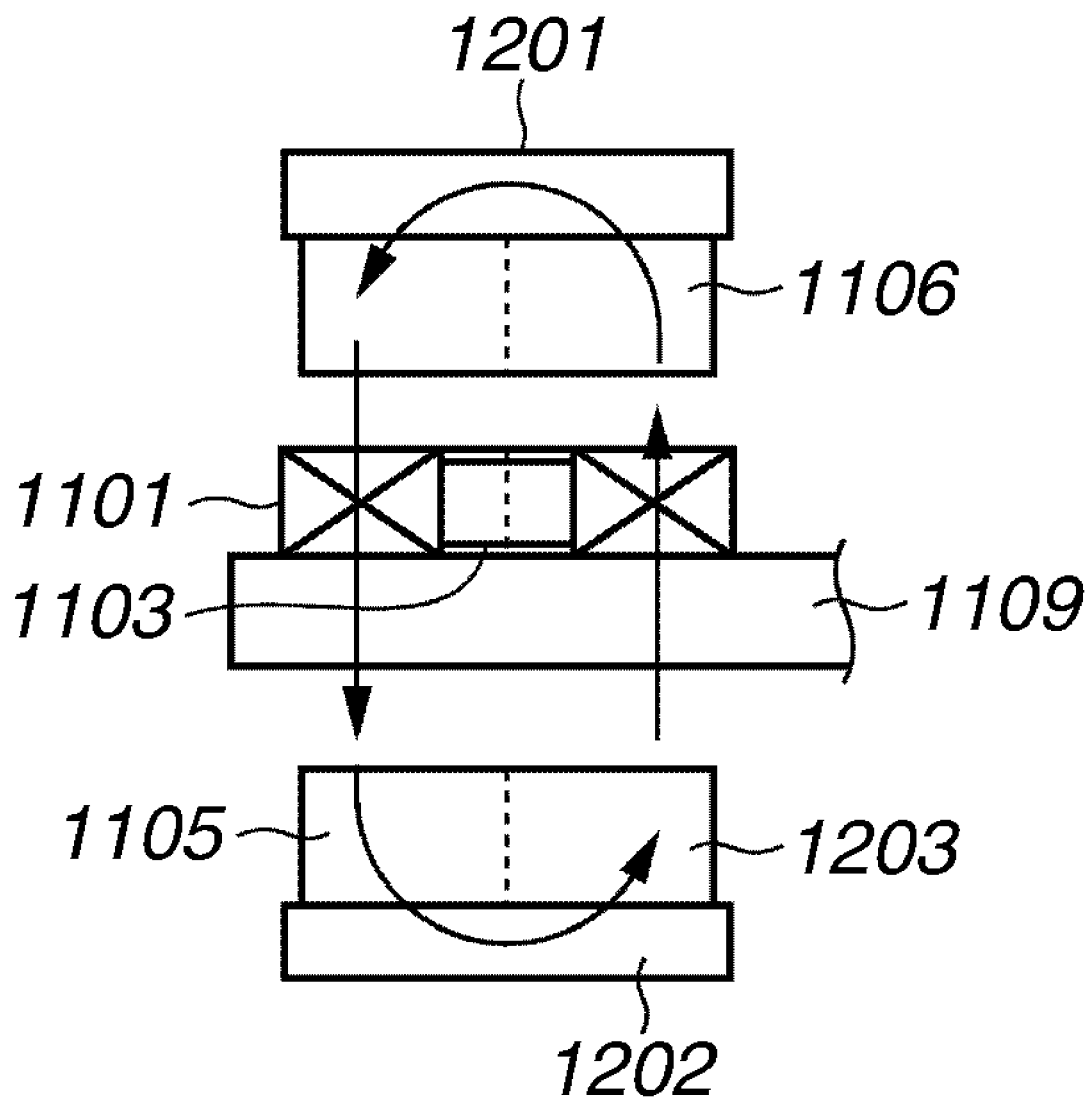
FIG. 14 illustrates a driving force generation unit in the second example of the camera-shake correction mechanism according to the first exemplary embodiment of the present invention.

FIGS. 13 and 14 illustrate the example mechanism that shift-drives the image sensor 106.

In FIG. 13, drive coils 1101 and 1102 generate driving force between magnets 1105 and 1106, and between 1107 and 1108 respectively, and drive a movable portion. Hall elements 1103 and 1104 perform position detection of the movable portion. A first guiding portion 1110 is provided on a first supporting portion 1109. A second guiding portion 1112 is provided on a second supporting portion 1111.

A third supporting portion 1113 is fixed to a barrel. A first elastic member 1114 is provided between the first supporting portion 1109 and a fixed portion (not shown). A second elastic member 1115 is provided on the second supporting portion 1111 and a fixed portion (not shown).

Guiding directions guided by the first guiding portion 1110 and the second guiding portion 1112 are perpendicular to each other. The first supporting portion 1109 having the image sensor 106 thereon is elastically supported by the first elastic member 1114 and the second elastic member 1115.

FIG. 14 illustrates a configuration of the drive unit. In the drive unit, two magnetic circuits are provided. The magnetic circuits have angles different from each other by 90 degrees, but have similar configurations. Accordingly, the description will be made using the drive unit having the drive coil 1101 and the magnets 1105 and 1106.

In FIG. 14, an arrow 1203 schematically shows magnetic flux (closed magnetic circuit). The magnets 1105 and 1106 are divided into two areas and magnetized respectively. Accordingly, as illustrated in FIG. 14, most of the magnetic flux forms the closed magnetic circuit 1203 that circulates via rear yokes 1201 and 1202.

By electric current flowing in the drive coil 1101, according to Fleming's left-hand rule, force to the drive coil 1101 is generated. By the balance among the generated force, the first elastic member 1114 and the second elastic member 1115, the first supporting portion 1109 and the image sensor 106 are displaced.

By the displacement of the first supporting portion 1109, the hall elements 1103 and 1104 provided on the first supporting portion 1109 are also displaced. As a result, the hall elements 1103 and 1104 are relatively displaced to the magnetic circuits provided on the fixed portion. Accordingly, based on signals from the hall elements 1103 and 1104, a position of the first supporting portion 1109 can be detected and feedback control can be performed.

Further, in exposure, based on lens information and a signal of the camera-shake detection sensor 108, by appropriately controlling the electric currents of the drive coils 1101 and 1102, a high-quality image that is less affected by the camera shake can be obtained.

A control block for the camera-shake correction system by moving the image sensor is similar to the above-described camera-shake correction system by moving the camera-shake correction lens 103 except for a point that the drive target is not the camera-shake correction lens 103 but the image sensor 106. In the example, the offset amount 301 is also appropriately set by the camera system control circuit 205 as described below.

In the above-described camera-shake correction system by the camera-shake correction lens 103, to set the offset amount, a method similar to the method described in the example of the camera-shake correction system by moving the image sensor can be applied. In the camera-shake correction system by moving the image sensor, the image sensor 106 is shift-driven. Accordingly, the offset amount converted into the formed object image (on the image sensor 106) is calculated.

Also in the camera-shake correction system by the camera-shake correction lens 103, since the camera-shake correction lens 103 is driven, an offset amount of the camera-shake correction lens 103 that is to be a movement distance on the image sensor 106 can be calculated from an optical magnification and used.

In the first exemplary embodiment, the method to improve quality of an image frame by moving a shadow of a foreign substance existing in the vicinity of the image sensor 106 and captured in a photographed image to a less noticeable area in the field image by the frame movement operation using the camera-shake correction operation has been described.

In a second exemplary embodiment of the present invention, by frame movement operation, a shadow of a foreign substance is moved to a pixel area where uniform image output is generated to a field image, and shooting is performed. The shadow of the foreign substance on the shot image is corrected by image processing (post-processing).

In FIG. 3A, the image frame is moved to a pixel area near the coordinates of the shadow of the foreign substance 200, the area having a uniform image output, for example, the position of G3 (x3, y3) on the background of FIG. 3A. The result is illustrated in FIG. 3C. In the state, the shadow of the foreign substance is noticeable.

However, since the output of the peripheral pixels adjacent to the pixel corresponding to the shadow of the foreign substance is even as compared to the pixel output corresponding to the shadow of the foreign substance, by performing the following interpolation processing of the image output, it is possible to accurately remove the shadow of the foreign substance.

A method to set the offset amount 301, which is an amount to move a frame, when the shadow of the foreign substance on the image sensor 106 is moved to the pixel area where the uniform image output is generated, is similar to the case described with reference to FIGS. 5, 6A, and 6B.

That is, after the coordinates of a shadow of one foreign substance to be moved are specified, pixels around the coordinates are divided into blocks. The pixels in the block are averaged to obtain luminance of the block. Based on the correlation among the obtained plurality of pieces of block luminance data and the size of the shadow of the foreign substance, central coordinates of a block nearest to the foreign substance coordinates and having uniform luminance and a predetermined number of blocks are determined. The coordinates are to be coordinates of a movement destination of the foreign substance.

For example, in the case of a large foreign substance that has a radius of five pixels or more, in uniform blocks having a block luminance difference of within two counts, an area nearest to the coordinates of the foreign substance where a block having at least a size of 3×3 exists is selected.

On the other hand, in the case of a foreign substance that has a radius of four pixels or less, a block area of 2×2 is selected. Then, the coordinates of the destination of the frame movement to be moved by the camera-shake correction system, which are the coordinates of the central coordinates of the areas each formed by the plurality of blocks, are G3 (x3, y3). Accordingly, the offset amount 301 ($\delta$) for the frame movement operation can be obtained by the following equation using the foreign substance coordinates G1 (x1, y1) and the frame movement destination coordinates G3 (x3, y3).

$$\delta = \sqrt{\{(x3-x1)^2 + (y3-y1)^2\}}$$

As described above, since the camera-shake correction lens 103 is moved on the two axes of x and y within the surface perpendicular to the optical axis 104, $\delta x = x3 - x1$, $\delta y = y3 - y1$ are actual control amount in the frame movement.

The imaging operation of the camera according to the second exemplary embodiment is similar to that described in the first exemplary embodiment with reference to FIG. 4.

Figure 15:
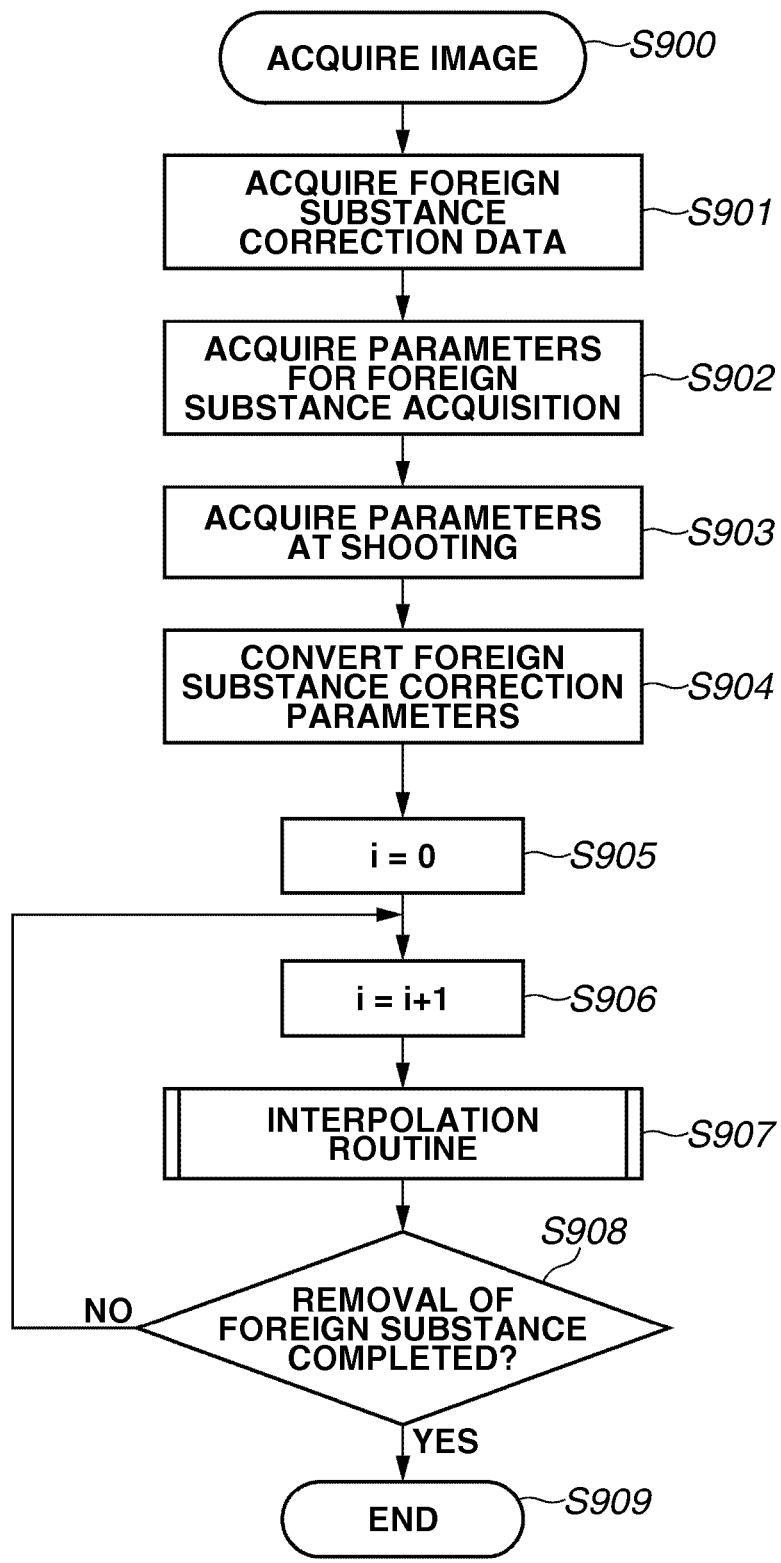
FIG. 15 is a flowchart illustrating foreign substance correction processing according to the second exemplary embodiment of the present invention.

The foreign substance removal processing, which performs image processing on a shadow of a foreign substance captured in a shot image and recorded in the external memory 107 to reduce the shadow, is specifically described with reference to FIG. 15. In the description, a case where the foreign substance removal processing is performed using an image processing program that operates not in the camera body but on a separately provided personal computer is described.

In step S900, normal shot image data to which foreign substance correction data is attached is read from the external memory 107 removed from the camera 101, and stored in a primary storage unit in the personal computer. In step S901, from the normally shot image data (a target image on which the foreign substance removal processing is to be performed), the foreign substance correction data attached to the shot image is extracted.

In step S902, from the foreign substance correction data extracted in step S901, a coordinate column Di (i=1, 2, ..., n) of the foreign substance, a radius column Ri (i=1, 2, ..., n) that is a size of the foreign substance, a diaphragm value F1, and a lens pupil position L1 are acquired.

In step S903, a diaphragm value F2 and a lens pupil position L2 at the shooting of the normally shot image are acquired. In step S904, the coordinate D1 is converted by the following equation. "d" denotes a distance from the image center to the coordinate D1, and H denotes a distance between the surface of the image sensor 106 and the foreign substance. A converted coordinate Di' and a converted radius Ri' are expressed as follows.

$$Di'(x, y) = (L2 \times (L1-H) \times d / ((L2-H) \times L1)) \times Di(x, y)$$

$$Ri' = (Ri \times F1/F2 + 3) \times 2$$

wherein the unit in the expressions is pixel, and "+3" in the expression of Ri' denotes a margin amount. In the expression, "(Ri×F1/F2+3)" is doubled because an area other than the foreign substance area is necessary in order to detect a foreign substance area using an average luminance.

In step S905, an interpolation processing counter i is initialized to zero. In step S906, i is counted up.

In step S907, interpolation routine described below is performed on an area expressed by an i-th coordinate Di' and radius Ri', and the foreign substance in the area is removed. In step S908, whether the foreign substance removal processing is performed on all of the coordinates is determined. When the processing is performed on the all coordinates (YES in step S908), the processing ends in step S909. When the processing is not performed on the all coordinates (NO in step S908), the processing returns to step S906.

The interpolation routine performed using repair processing is described. The repair processing is performed to detect an isolated area that satisfies a condition preliminarily determined within a specified area and interpolate the isolation area by peripheral pixels.

Figure 16:
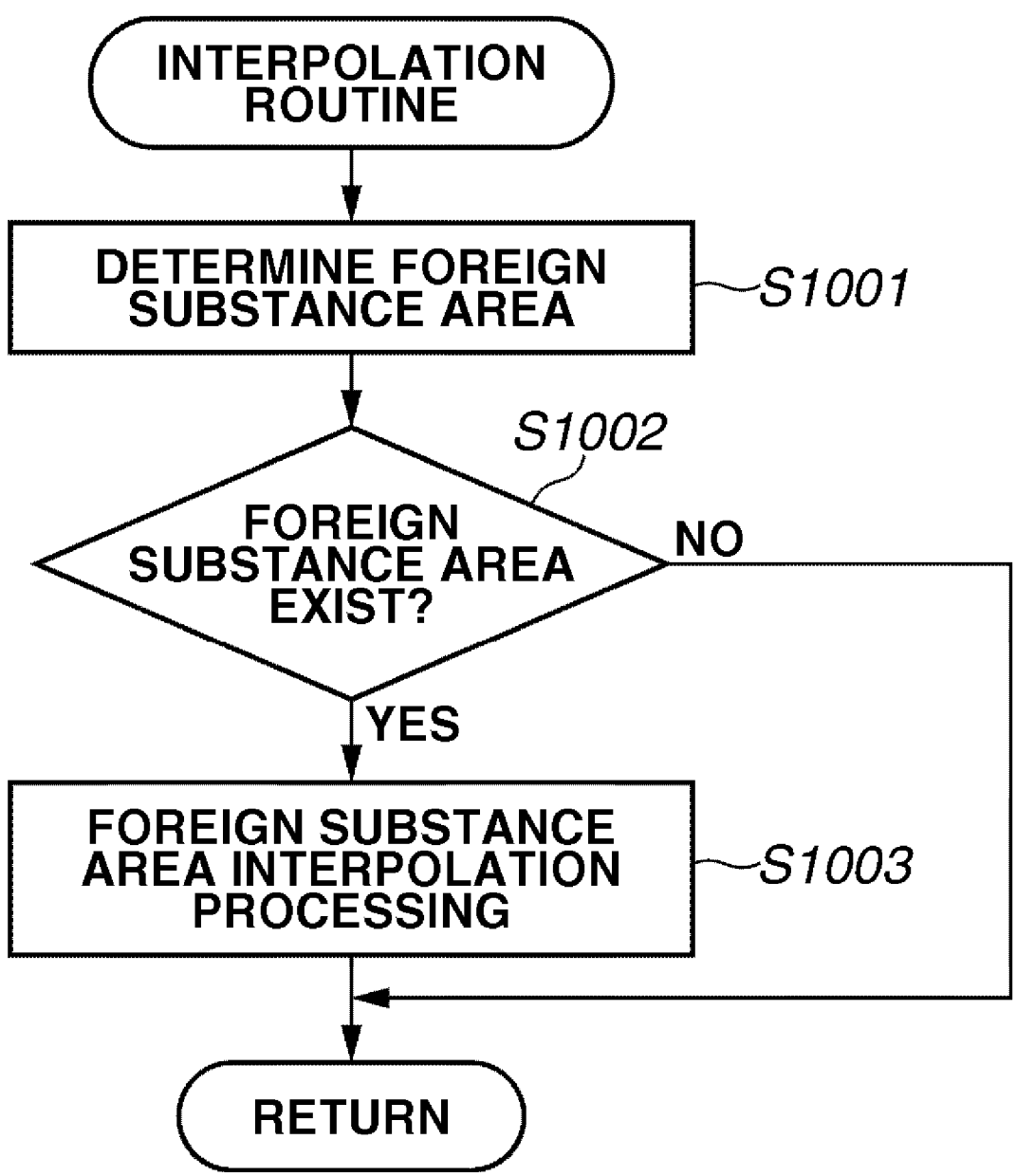
FIG. 16 is a flowchart illustrating interpolation routine according to the second exemplary embodiment of the present invention.

FIG. 16 is a flowchart illustrating a flow of the interpolation routine. In step S1001, a foreign substance area is determined. In the processing, it is assumed that a central coordinate of the area to be repair-processed is P, and a radius is R. The foreign substance area is an area that satisfies all of the following conditions.

(1) An area having a brightness value smaller than a threshold T2 obtained by the following equation using an average luminance Yave and a maximum luminance Ymax of a pixel contained in the repair processing target area.

$$T2 = Yave \times 0.6 + Ymax \times 0.4$$

(2) An area that does not contact the circle expressed by the central coordinates P and the radius R.
(3) An area of which a radius value calculated by a method similar to that in step S803 in FIG. 8 with respect to the isolated area that is composed of the pixels having the low luminance selected in (1) is 11 pixels or more and less than 12 pixels.

In the second exemplary embodiment, 11 is three pixels, and 12 is 30 pixels. Thereby, it is possible to determine only an isolated small area as the foreign substance area.

In step S1002, when a foreign substance area exists (YES in step S1002), the processing proceeds to step S1003 and the foreign substance area interpolation is performed. When a foreign substance area does not exist (NO in step S1002), the processing ends.

The foreign substance area interpolation processing in step S1003 is performed using a known defective area interpolation method. An example of the known defective area interpolation method is pattern replacement, discussed in Japanese Patent Application Laid-Open No. 2001-223894.

In the method discussed in Japanese Patent Application Laid-Open No. 2001-223894, a defective area is specified using infrared light. In the exemplary embodiment, the foreign substance area detected in step S1001 is specified as the defective area, and the foreign substance area is interpolated by peripheral normal pixels by the pattern replacement.

For a pixel that is not replaced by the pattern replacement, p normal pixels are selected in ascending order of distance from the interpolation target pixel, and q normal pixels are selected in descending order. Then, interpolation is performed using the average color of the pixels on the pattern-replacement processed image data.

As described above, in the second exemplary embodiment, the example has been described in that once shooting is performed by the camera, and the foreign substance image data is stored, then, for example, using the personal computer, the shot image is acquired. Thus, the image processing is performed by the personal computer according to the external program to perform foreign substance processing.

However, the image processing may be performed in the camera. That is, during image processing performed after main exposure of shooting, the interpolation processing may be performed. Alternatively, after the main exposure and the image processing, once the image data is recorded in the external memory 107, and the photographer may call up the image data again and manually perform the interpolation processing program.

In the method according to the exemplary embodiment, the post-processing (image processing) is needed. By the processing, almost all of the effect of the shadow of the foreign substance can be removed. Further, the probability of existence of a uniform luminance area on a frame where a shadow of a foreign substance is to be moved is substantially high. Accordingly, the amount to move the shadow of the foreign substance can be smaller, and results in smaller possibility of changing the shot composition.

In the above-described first and second exemplary embodiments of the present invention, frame movement destination coordinates are determined based on luminance distribution of a captured image. However, by performing spatial frequency analysis on the output of an image using a known discrete cosine transform (DCT), coordinates of an area having a high spatial frequency may be used as the frame movement destination coordinates.

More specifically, with respect to each component of RGB of an original image, a periphery of coordinates of a foreign substance is divided into small blocks of 8×8 pixels, and the DCT operation is performed on each small block. By the operation, the spatial frequency component can be numeric-converted to determine whether the component belongs to a high frequency region or a low frequency region (spatial frequency distribution detection).

As described in the first exemplary embodiment, when a shadow of a foreign substance is moved to an area less noticeable in a frame, the shadow of the foreign substance is less noticeable when the shadow is moved to an area having a high spatial frequency. Accordingly, the area (block) having the high spatial frequency is determined as a movement destination of the shadow of the foreign substance.

Further, as described in the second exemplary embodiment, when the shadow of the foreign substance is moved to remove the shadow by the image processing after the shooting, an area (block) having a low spatial frequency is determined as a destination of the foreign substance coordinate. If the coordinate of the movement destination of the shadow of the foreign substance is determined, it is possible to finally obtain the shot scene having the less noticeable foreign substance by using the imaging operation in the first exemplary embodiment illustrated in FIG. 4 or the image processing of the foreign substance interpolation in the second exemplary embodiment.

In the above-described exemplary embodiments, the still camera for finally obtaining a still image has been described. However, as is understood from the flowchart in FIG. 4, the sequence from step S500 to step S513 is live view shooting for shooting field images continuously. On the continuous images, by sequentially performing a codec processing such as MPEG1 and writing the data on a medium such as a magnetic tape or an optical disk, the camera can be used as a video camera. In such a case, a foreign substance is recorded as a video picture in which the foreign substance is moved and held in an area less noticeable in the image frame.

Further, the present invention can be applied to a single-lens reflex camera having a quick-return mirror system, which cannot perform live view shooting.

Figure 17:
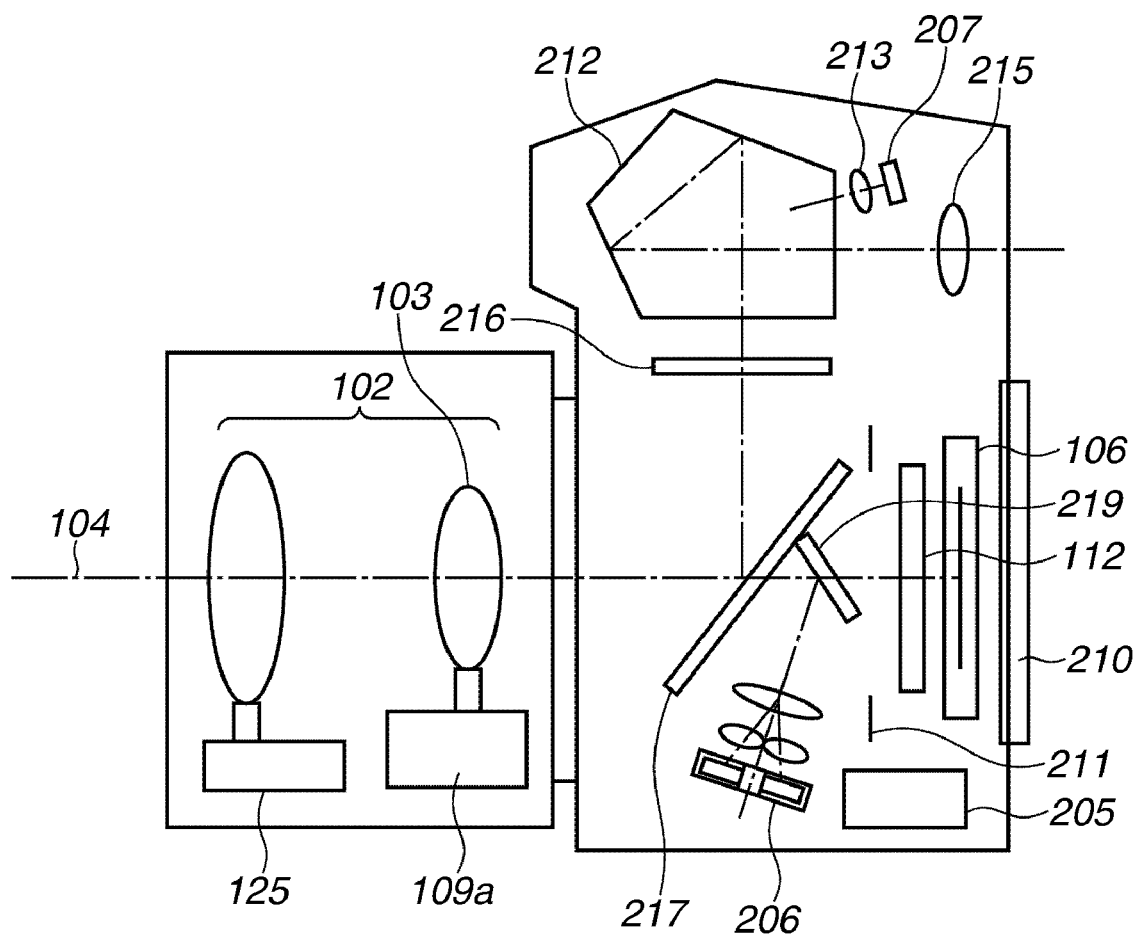
FIG. 17 is a schematic view illustrating an imaging apparatus according to a third exemplary embodiment of the present invention.

FIG. 17 is a schematic diagram illustrating a single-lens reflex camera to which the present invention is applied. In FIG. 17, to the same functional components as the camera in FIG. 1 described in the first exemplary embodiment, the same reference numerals are designated.

In the camera, during field observation, a quick-return mirror 217 is in a down state tilted by 45 degrees to the optical axis 104 in the imaging optical system 102, and a blade type shutter 211 for performing exposure control of the image sensor 106 is shut.

Therefore, during the field observation, projection and exposure of the field image to the image sensor 106 is not performed. Accordingly, it is impossible, for example, to display the field on the display unit 210 and observe the field by using the live view function.

However, primary image formation of the field light is performed on a focus plate 216 via the quick-return mirror 217. The photographer can observe the field image on the focus plate 216 via a pentagonal prism 212 and an eyepiece lens 215.

Further, since the above-described camera-shake correction system is installed, the camera-shake correction lens 103 is driven. Accordingly, the photographer can view a field image on which the camera-shake correction is performed and confirm the effect of the correction.

Meanwhile, in order to perform the frame movement that moves a foreign substance to a less noticeable area in a shot field image described in the exemplary embodiments, it is necessary to acquire the real time field image and analyze the image.

In the example, the acquisition of the field image is performed by the AE sensor 207. That is, the primary-formed field image on the focus plate 216 is led to the AE sensor 207 by a projection lens 213. That is, the AE sensor 207 can detect field luminance except for the time when the quick-return mirror 217 is up for the shooting and thereby the field light does not enter the AE sensor 207.

In the AE sensor 207, a light reception portion is divided into areas of 60×90 (vertical×horizontal). Accordingly, it is possible to similarly divide the field into small areas of 60×90, and detect luminance (luminance distribution detection). When luminance data of the small areas is obtained, the calculation of an amount of frame movement (the offset amount 301), which is the operation performed in step S605 and subsequent steps of the flowchart in FIG. 5, can be executed. Based on the calculated value, the camera-shake correction lens 103 is controlled.

AS described above, in the single-lens reflex camera having the basic configuration (i.e., only the optical finder without the live view function), the camera with the functions similar to those described in the first and second exemplary embodiments of the present invention can be provided.

Meanwhile, when the frame movement for moving a foreign substance to a less noticeable area in a shooting field image is performed, the moved composition is slightly changed from a shooting composition the photographer originally has intended.

The case is described with reference to FIGS. 3A to 3C again. The shooting composition originally intended is illustrated in FIG. 3A. When the composition is changed to the composition illustrated in FIG. 3B by the camera-shake correction system described in the first exemplary embodiment, the position of the main object is displaced to the lower portion of the frame.

When the composition is changed to that illustrated in FIG. 3C in the second exemplary embodiment, the main object is displaced to the left side. When the amount of the change is not accepted by the photographer, it is effective to perform trimming on a shot frame based on the size of the frame movement amount (i.e., the offset amount 301).

For example, when the frame movement is performed to an upper portion of the frame based on the converted pixels of the image sensor 106, to reproduce the composition center before the frame movement is performed and maintain the aspect ratio of 3:2 (horizontal:vertical) in width and height, trimming for deleting the vertical upper pixels and the right and left pixels is performed (trimming line A).

Similarly, in FIG. 3C, when the pixels are moved to the right direction in the frame, trimming for deleting the pixels in the right side in the frame and the upper pixels is performed (trimming line B). The trimming processing may be automatically performed by the camera after the shooting and before the recording of the data in the external memory 107. Further, after the data is once recorded, the photographer reads the image, and the trimming processing may be performed.

An aspect of the present invention is also achieved by the following method. That is, a storage medium (or recording medium), which records software program code to implement the functions of the above-described exemplary embodiments, is supplied to a system or apparatus. A computer (or a central processing unit (CPU) or a micro processing unit (MPU)) of the system or apparatus reads out and executes the program code stored in the storage medium. In this case, the program code read out from the storage medium implements the functions of the above-described embodiments, and accordingly, the storage medium storing the program code constitutes the present invention.

The functions of the above-described exemplary embodiments are implemented not only by the computer by reading and executing the program code. The present invention can also be embodied in the following arrangement. The operating system (OS) running on the computer executes a part or the whole of the actual processing based on of the instructions of the program code, thereby implementing the functions of the above-described embodiments.

Further, an aspect of the present invention can also be achieved by the following arrangement. That is, the program code read out from the storage medium is written in the memory of a function expansion card inserted into the computer or a function expansion unit connected to the computer. The operating system (OS) running on the computer executes a portion or the whole of the actual processing on the basis of the instructions of the program code, thereby implementing the functions of the above-described embodiments.

When the present invention is applied to the above-described storage medium, in the storage medium, program code corresponding to the above-described procedures is stored.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application 2008-174956 filed Jul. 3, 2008, which is hereby incorporated by reference herein in its entirety.

What is claimed is:

1. An imaging apparatus comprising:
    an image sensor configured to photoelectrically convert an image of an object formed by an imaging lens to generate an image signal;
    a foreign substance information detection unit configured to detect foreign substance information including at least information about a position of a foreign substance adhered to an optical element disposed in front of the image sensor;
    a determination unit configured to determine whether the position of the foreign substance detected by the foreign substance information detection unit overlaps a predetermined area of the object by analyzing the image signal of the object generated by the image sensor; and a changing unit configured to change a relative position of the image of the object formed on the image sensor and the image sensor when the determination unit determines that the position of the foreign substance overlaps the predetermined area.

2. The imaging apparatus according to claim 1, wherein the changing unit changes the relative position of the object image and the image sensor by displacing the camera-shake correction lens included in the imaging lens.

3. The imaging apparatus according to claim 1, wherein the changing unit changes the relative position of the object image and the image sensor by displacing the image sensor.

4. The imaging apparatus according to claim 1, wherein the determination unit includes a luminance distribution detection unit configured to divide the image of the object into small areas and detect luminance of each of the small areas, and based on the luminance of an area in the vicinity of the position of the foreign substance detected by the luminance distribution detection unit, and determines whether the foreign substance position overlaps the predetermined area.

5. The imaging apparatus according to claim 4, wherein the changing unit changes the relative position of the object image and the image sensor such that the foreign substance is moved to an area having low luminance in the object.

6. The imaging apparatus according to claim 4, wherein the changing unit changes the relative position of the object image and the image sensor such that the foreign substance is moved to a uniform luminance area in the object.

7. The imaging apparatus according to claim 1, wherein the determination unit includes a spatial frequency distribution detection unit configured to divide the object into small areas and detect spatial frequencies in each of the small areas, and based on a spatial frequency of an area in the vicinity of the position of the foreign substance detected by the spatial frequency distribution detection unit, and determines whether the foreign substance position overlaps the predetermined area.

8. The imaging apparatus according to claim 7, wherein the changing unit changes the relative position of the object image and the image sensor such that the foreign substance is moved to an area having a high spatial frequency in the object.

9. The imaging apparatus according to claim 7, wherein the changing unit changes the relative position of the object image and the image sensor such that the foreign substance is moved to an area having a low spatial frequency in the object.

10. The imaging apparatus according to claim 1, further comprising, an interpolation unit configured to interpolate a signal of a shadow of the foreign substance output from a pixel in the image sensor using signals output from peripheral pixels thereof after the relative position of the object image formed on the image sensor and the image sensor is changed by the changing unit.

11. A computer-readable storage medium storing a program for implementing the control method according to claim 10.

12. A method for controlling an imaging apparatus having an image sensor configured to photoelectrically convert an image of an object formed by an imaging lens to generate an image signal, the method comprising:

detecting a foreign substance information about at last including a position of the foreign substance adhered to an optical element disposed in front of the image sensor;

determining whether the position of the detected foreign substance overlaps a predetermined area of the object by analyzing the image signal of the object generated by the image sensor; and changing a relative position of the image of the object formed on the image sensor and the image sensor when it is determined that the position of the foreign substance overlaps the predetermined area.

* * * * *